US010140879B1

(12) United States Patent
Greenwald et al.

(10) Patent No.: US 10,140,879 B1
(45) Date of Patent: Nov. 27, 2018

(54) INTERACTIVE BEHAVIORAL TREATMENT DELIVERY SYSTEM AND METHOD OF USE

(71) Applicants: Ashley Greenwald, Reno, NV (US); Kerry Nemovicher, Reno, NV (US); Kerry A. Greenwald, Boca Raton, FL (US)

(72) Inventors: Ashley Greenwald, Reno, NV (US); Kerry Nemovicher, Reno, NV (US); Kerry A. Greenwald, Boca Raton, FL (US)

( * ) Notice: Subject to any disclaimer, the term of this patent is extended or adjusted under 35 U.S.C. 154(b) by 19 days.

(21) Appl. No.: 13/815,216

(22) Filed: Feb. 11, 2013

Related U.S. Application Data

(60) Provisional application No. 61/597,685, filed on Feb. 10, 2012.

(51) Int. Cl.
*G09B 7/00* (2006.01)
*G06Q 10/10* (2012.01)
*G09B 5/00* (2006.01)

(52) U.S. Cl.
CPC .................................. *G09B 5/00* (2013.01)

(58) Field of Classification Search
CPC .............................. G06Q 10/10; G09B 7/00
USPC ...................................................... 434/238
See application file for complete search history.

(56) References Cited

U.S. PATENT DOCUMENTS

2003/0059750 A1* 3/2003 Bindler et al. ............. 434/236
2008/0300917 A1* 12/2008 Ryan ................... G06F 19/3418
705/2

2009/0164917 A1* 6/2009 Kelly ..................... G06F 3/011
715/757
2012/0178064 A1* 7/2012 Katz ............................. 434/236
2013/0316324 A1* 11/2013 Hoffmann .................... 434/362

OTHER PUBLICATIONS

A group training program in behavior modification for mothers of children with birth defects, Fishman, C., et al, Child Psychiatry Hum Dev., 1975 Fall;6(1):3-14.*
Claire A. Fishman and Daniel B. Fishman; A Group Training Program in Behavior Modification for Mothers of Children with Birth Defects; Child Psychiatry & Human Development; Fall 1975, vol. 6, Issue 1, pp. 3-14.
William S. Brasted and Edward J. Callahan; An Evaluation of the Electronic Fetal Monitor As a Feedback Device During Labor; Journal of Applied Behavior Analysis; Summer 1984, 17, 261-266.

* cited by examiner

*Primary Examiner* — Thomas Hong
(74) *Attorney, Agent, or Firm* — Holland & Hart LLP

(57) ABSTRACT

Systems and methods are disclosed for presenting medical treatment information relating to a patient's conditions or symptoms. Some embodiments of the system include interactive display views presenting patient behavioral instructional information in multiple formats, including, for example, textual and/or multimedia. Some embodiments of the system can present information such as, for example, guidance on how to administer and/or receive one or more medical treatments. Information presented can, in part, be determined by logical processing of information obtained interactively from a patient, patient's assistance, biometric data collection device, and/or medical practitioner. The system can log session navigation and data collection information to a local data store and/or transmit that information to a remote device for additional processing and/or storage. In one embodiment, the system provides behavior based birthing assistance.

22 Claims, 47 Drawing Sheets

This software and its content is copyright of Ashley Greenwald - © Behavior Based Birthing 2012. All rights reserved.

Any redistribution or reproduction of part or all of the contents in any form is prohibited.

You may not, except with owner's express written permission, distribute or commercially exploit the content. Nor may you photograph screen shots, transmit it or store it in any other form of electronic retrieval system.

01/27/2013 06:57:43 AM, hand_massage, 1, 2, 3
01/27/2013 06:57:54 AM, hand_massage, 5, 5, 4
01/27/2013 07:00:17 AM, breathing_8_seconds, 8, 8, 8
01/27/2013 07:00:57 AM, side_lying, 10, 10, 10

812

| T_Contraction | Video | PainLevel | ControlLevel | PartnerSupportLevel |
|---|---|---|---|---|
| 1/27/13 6:57 | hand_massage | 1 | 2 | 3 |
| 1/27/13 6:57 | hand_massage | 5 | 5 | 4 |
| 1/27/13 7:00 | breathing_8_seconds | 8 | 8 | 8 |
| 1/27/13 7:00 | side_lying | 10 | 10 | 10 |

Figure 28

01/27/2013 06:56:50 AM User navigated to: Setup.
01/27/2013 06:57:05 AM Setup saved with configuration:
Birth ball: YES
Massage tool: NO
Heat cold pack: NO
Shower: YES
Bathtub: NO
Confined to bed: YES
Epidural: NO
Fetal Monitor: NO
Dilation 4cm
Effacement 40%
Station 0
Drink Reminder: YES
Pee Reminder: YES 01/27/2013 06:57:13 AM User navigated to: Home.
01/27/2013 06:57:20 AM User navigated to: Massage video page.
01/27/2013 06:57:22 AM User has selected the hand_massage video.
01/27/2013 06:57:22 AM User navigated to: Play video page.
01/27/2013 06:57:22 AM Playing movie: hand_massage
01/27/2013 06:57:25 AM User has selected hand_massage for their next contraction
01/27/2013 06:57:26 AM Video finished playing.
01/27/2013 06:57:26 AM User navigated to: Select Challenge
01/27/2013 06:57:28 AM User navigated to: Labor Progress page.
01/27/2013 06:57:35 AM User navigated to: Contraction page.
01/27/2013 06:57:36 AM Contractions started
01/27/2013 06:57:36 AM Playing movie: hand_massage
01/27/2013 06:57:38 AM Contractions End
01/27/2013 06:57:38 AM Question page presented to user.
01/27/2013 06:57:43 AM Post contraction questions answered.
Indicated level of pain: 1
Indicated level of control: 2
Indicated level of partner support: 3
01/27/2013 06:57:43 AM Post contraction questions answered.
Indicated level of pain: 1
Indicated level of control: 2
Indicated level of partner support: 3
01/27/2013 06:57:43 AM User navigated to: Home.
01/27/2013 06:57:46 AM User navigated to: Contraction page.
01/27/2013 06:57:46 AM Contractions started
01/27/2013 06:57:46 AM Playing movie: hand_massage
01/27/2013 06:57:49 AM Contractions End
01/27/2013 06:57:49 AM Question page presented to user.
01/27/2013 06:57:54 AM Post contraction questions answered.
Indicated level of pain: 5
Indicated level of control: 5
Indicated level of partner support: 4
01/27/2013 06:57:54 AM User navigated to: Labor Progress page.
01/27/2013 06:58:00 AM User updated Labor Progress.
Dilation: 6cm
Effacement: 60%
Station: 2

Figure 30

| Key | Type | Value |
|---|---|---|
| ▼ Root | Dictionary | (6 items) |
| ▼ Slow labor | Dictionary | (5 items) |
| ▶ Kneel | Dictionary | (7 items) |
| ▶ Stand | Dictionary | (5 items) |
| ▶ Sit | Dictionary | (2 items) |
| ▶ Squat | Dictionary | (3 items) |
| ▶ Lay | Dictionary | (3 items) |
| ▼ Exhaustion | Dictionary | (4 items) |
| ▶ Kneel | Dictionary | (3 items) |
| ▶ Sit | Dictionary | (4 items) |
| ▶ Squat | Dictionary | (1 item) |
| ▶ Lay | Dictionary | (4 items) |
| ▼ Pain | Dictionary | (3 items) |
| ▶ Stomach | Dictionary | (6 items) |
| ▶ Hip and Thigh | Dictionary | (6 items) |
| ▶ Back | Dictionary | (5 items) |
| ▼ Progressing too quickly | Dictionary | (2 items) |
| ▶ Kneel | Dictionary | (4 items) |
| ▶ Lay | Dictionary | (1 item) |
| ▼ Fear, stress, or panic | Dictionary | (6 items) |
| ▶ Water | Dictionary | (5 items) |
| ▶ Kneel | Dictionary | (1 item) |
| ▶ Stand | Dictionary | (1 item) |
| ▶ Sit | Dictionary | (2 items) |
| ▶ Squat | Dictionary | (1 item) |
| ▶ Lay | Dictionary | (3 items) |
| ▼ Baby in bad position | Dictionary | (4 items) |
| ▶ Kneel | Dictionary | (5 items) |
| ▶ Stand | Dictionary | (3 items) |
| ▶ Sit | Dictionary | (1 item) |
| ▶ Lay | Dictionary | (2 items) |

Figure 32

| Key | Type | Value |
|---|---|---|
| ▼ Slow labor | Dictionary | (5 items) |
| ▼ Kneel | Dictionary | (7 items) |
| ▼ Kneeling lunge | Dictionary | (6 items) |
| Light touch | String | light_touch |
| Massage tool | String | kneeling_lunge_mt |
| Supportive words | String | kneeling_lunge |
| Massage hands | String | hand_massage |
| Massage shoulders | String | shoulder_massage |
| Don't touch | String | kneeling_lunge |
| ▼ Hands and knees | Dictionary | (4 items) |
| Light touch | String | light_touch |
| Massage tool | String | hands_and_knees_mt |
| Supportive words | String | hands_and_knees |
| Don't touch | String | hands_and_knees |
| ▼ Kneel and lean on chair | Dictionary | (4 items) |
| Light touch | String | light_touch |
| Massage tool | String | kneel_and_lean_forward_on_chair_mt |
| Supportive words | String | kneel_and_lean_forward_on_chair |
| Don't touch | String | kneel_and_lean_forward_on_chair |
| ▼ Kneel in bed and lean on partner | Dictionary | (1 item) |
| No actions for partner | String | kneel_in_bed_and_lean_forward_on_partner |
| ▼ Kneel and lean on birth ball | Dictionary | (4 items) |
| Light touch | String | light_touch |
| Massage tool | String | kneel_onto_birthball_mt |
| Supportive words | String | kneel_onto_birthball |
| Don't touch | String | kneel_onto_birthball |
| ▼ Pelvic rocking | Dictionary | (2 items) |
| Supportive words | String | pelvic_rocking |
| Don't touch | String | pelvic_rocking |
| ▼ Open knee-chest | Dictionary | (4 items) |
| Light touch | String | light_touch |
| Massage tool | String | open_knee_chest_mt |
| Supportive words | String | open_knee_chest |
| Don't touch | String | open_knee_chest |

Supportive Words

Hang in there!
A note of support without a lot of pressure.

You're doing a great job.
She may not believe you even if it's true. Her experience of what is going on feels much differently than what you're seeing. Meaning she may feel out of control while she looks calm and collected.

Think of the baby –
For a mother who wants to be reminded of the baby in labor, which is easier than you think to forget about, this can be helpful. You might also use a similar phrase agreed upon in labor.

Awesome!
A nice quick word of encouragement to whisper in her ear when she's got very low contraction levels.

You will never have that contraction again.
It might be helpful to be reminded that once a contraction passes, that one is gone for good and with each contraction she getting closer to birth.

Keep going ...
A nod of approval during a long labor, as in "I know you're tired, but you're doing great, so keep going ..."

I'm here for you.
You're not leaving her side, be sure she knows that.

Just a bit more ...
Use this one only if you're reasonably sure that it's true. Otherwise you lose your credibility. Ask a nearby professional for some help here and know they are guessing too.

You are doing it!
This is a great thing to say if she says something like, "I can't do it." You can reply, "But you are doing it!"

― 608

[ HOME ] [ CHALLENGE ] ( ) ( ) [ SUPPORTIVE WORDS ] ( ) [ MORE ]

INTERACTIVE BEHAVIORAL TREATMENT DELIVERY SYSTEM AND METHOD OF USE

CROSS-REFERENCE TO RELATED APPLICATIONS

The present application for patent claims priority through prior U.S. provisional patent application by two of the present applicants, entitled Behavior Based Birthing, Ser. No. 61/597,685, filed Feb. 10, 2012, which U.S. provisional patent application is hereby incorporated by reference in its entirety.

COMPUTER PROGRAM LISTING APPENDIX

A Computer Program Listing Appendix was submitted electronically and is included with this application. The entire contents of the Computer Program Listing Appendix is incorporated herein by reference. The Computer Program Listing Appendix includes the following files:

Files Contained on Computer Program Listing Appendix

| File No. | File Name | Date Created | File Size (Bytes) |
| --- | --- | --- | --- |
| 1 | InfoPlist.strings | Jan. 13, 2013 | 47 |
| 2 | MainStoryboard.storyboard | Jan. 24, 2013 | 243399 |
| 3 | Stork_Assist-Info.plist | Jan. 13, 2013 | 1782 |
| 4 | Stork_Assist-Prefix.pch | Jan. 13, 2013 | 323 |
| 5 | Stork_Assist.xcodeproj | Jan. 24, 2013 | 170 |
| 6 | availableIfConfined.plist | Jan. 13, 2013 | 1943 |
| 7 | bbbActionsForMeViewController.h | Jan. 13, 2013 | 389 |
| 8 | bbbActionsForMeViewController.m | Jan. 13, 2013 | 9143 |
| 9 | bbbAffirmationsViewController.h | Jan. 13, 2013 | 242 |
| 10 | bbbAffirmationsViewController.m | Jan. 13, 2013 | 1169 |
| 11 | bbbAppDelegate.h | Jan. 13, 2013 | 391 |
| 12 | bbbAppDelegate.m | Jan. 13, 2013 | 2317 |
| 13 | bbbBreathingViewController.h | Jan. 13, 2013 | 281 |
| 14 | bbbBreathingViewController.m | Jan. 13, 2013 | 2191 |
| 15 | bbbChallengeData.h | Jan. 13, 2013 | 2152 |
| 16 | bbbChallengeData.m | Jan. 13, 2013 | 23553 |
| 17 | bbbConsentViewController.h | Jan. 13, 2013 | 140 |
| 18 | bbbConsentViewController.m | Jan. 13, 2013 | 923 |
| 19 | bbbContractionViewController.h | Jan. 13, 2013 | 1148 |
| 20 | bbbContractionViewController.m | Jan. 30, 2013 | 13389 |
| 21 | bbbCopyViewController.h | Jan. 13, 2013 | 214 |
| 22 | bbbCopyViewController.m | Jan. 13, 2013 | 1951 |
| 23 | bbbHippaViewController.h | Jan. 13, 2013 | 140 |
| 24 | bbbHippaViewController.m | Jan. 13, 2013 | 915 |
| 25 | bbbHomeViewController.h | Jan. 13, 2013 | 556 |
| 26 | bbbHomeViewController.m | Jan. 13, 2013 | 2617 |
| 27 | bbbInstructionsViewController.h | Jan. 13, 2013 | 210 |
| 28 | bbbInstructionsViewController.m | Jan. 13, 2013 | 3166 |
| 29 | bbbLaborProgressViewController.h | Jan. 13, 2013 | 1183 |
| 30 | bbbLaborProgressViewController.m | Jan. 13, 2013 | 9286 |
| 31 | bbbMailComposerViewController.h | Jan. 13, 2013 | 1006 |
| 32 | bbbMailComposerViewController.m | Jan. 30, 2013 | 6824 |
| 33 | bbbMassageViewController.h | Jan. 13, 2013 | 276 |
| 34 | bbbMassageViewController.m | Jan. 13, 2013 | 2264 |
| 35 | bbbMenuNavigationViewController.h | Jan. 13, 2013 | 164 |
| 36 | bbbMenuNavigationViewController.m | Jan. 13, 2013 | 1030 |
| 37 | bbbPainTableViewController.h | Jan. 13, 2013 | 340 |
| 38 | bbbPainTableViewController.m | Jan. 13, 2013 | 5248 |
| 39 | bbbPartnerActionsViewController.h | Jan. 13, 2013 | 388 |
| 40 | bbbPartnerActionsViewController.m | Jan. 13, 2013 | 6761 |
| 41 | bbbPlayVideoViewController.h | Jan. 13, 2013 | 1765 |
| 42 | bbbPlayVideoViewController.m | Jan. 30, 2013 | 11471 |
| 43 | bbbPositionsForMeViewController.h | Jan. 13, 2013 | 325 |
| 44 | bbbPositionsForMeViewController.m | Jan. 13, 2013 | 4883 |
| 45 | bbbQuestionViewController.h | Jan. 13, 2013 | 900 |
| 46 | bbbQuestionViewController.m | Jan. 13, 2013 | 4348 |
| 47 | bbbRythmicMovementViewController.h | Jan. 13, 2013 | 288 |
| 48 | bbbRythmicMovementViewController.m | Jan. 13, 2013 | 2317 |
| 49 | bbbSetupViewController.h | Jan. 13, 2013 | 1549 |
| 50 | bbbSetupViewController.m | Jan. 13, 2013 | 6692 |
| 51 | bbbSupportiveWordsViewController.h | Jan. 13, 2013 | 248 |
| 52 | bbbSupportiveWordsViewController.m | Jan. 13, 2013 | 1127 |
| 53 | bbbTableViewController.h | Jan. 13, 2013 | 321 |
| 54 | bbbTableViewController.m | Jan. 13, 2013 | 6260 |
| 55 | bbbTitleViewController.h | Jan. 13, 2013 | 158 |
| 56 | bbbTitleViewController.m | Jan. 13, 2013 | 1207 |
| 57 | bbbViewController.h | Jan. 13, 2013 | 689 |
| 58 | bbbViewController.m | Jan. 13, 2013 | 1332 |
| 59 | bbbWelcomeViewController.h | Jan. 13, 2013 | 202 |
| 60 | bbbWelcomeViewController.m | Jan. 13, 2013 | 1728 |
| 61 | challenges.plist | Jan. 13, 2013 | 40552 |
| 62 | main.m | Jan. 13, 2013 | 256 |
| 63 | menuMeta.plist | Jan. 13, 2013 | 1345 |
| 64 | supportAndAffirmations.plist | Sep. 18, 2012 | 1970 |

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

The files included in the Computer Program Listing Appendix are subject to copyright protection and any use thereof, other than as part of the reproduction of the patent document or the patent disclosure, is strictly prohibited.

FIELD OF TECHNOLOGY

The present application relates to health care practices and more particularly to interactive methods and systems for the delivery of behavioral treatments. One particular application is a birthing patient behavioral instruction system.

BACKGROUND

In many circumstances where medical treatment is appropriate, behavior-based treatments may be an alternative or additional approach to other types of medical treatments. Delivery of behavior-based treatments can involve guidance to the patient that accounts for the condition of the patient, the preferences of the patient, the responsiveness of the patient to particular treatment types, as well as the relevant circumstance in existence at the time a treatment is proposed.

One method of accounting for these variables when providing guidance to a patient has been to engage medical practitioners directly to provide oversight, diagnosis, instruction, and/or treatment. One problem with this approach is that it requires direct access to the medical practitioner at the time that treatment is required, which can be impractical and/or impossible at certain times. In addition, such access to practitioners, if available, can be quite costly, even for routine guidance.

In an effort to provide patients assistance in making treatment decisions without direct access to a medical practitioner, patient education programs have been developed. These programs have attempted to educate patients in advance of the need for treatment guidance. However, this approach has lacked a number of elements conducive to reliable and accurate treatment. First, when a patient is under the stress and challenges associated with the symptoms of a particular condition, it can be difficult for the patient or those with them at the time to remember the teachings delivered during the educational program, or to think clearly enough to apply the teachings correctly. Further, the number of variables used to deduce the proper treatment can be large, and the relational complexity among the variables can be significant. This approach relied on the patient to be able to account for and mentally consider the set of variables and apply whatever rule-based decision-making was necessary to determine the appropriate treatment, even when relational complexity was prohibitively complex.

An approach used in some situations has involved providing the patient with a document incorporating rules and pictures into a type of decision matrix that the patient could then use to try to ascertain the optimal behavior-based treatment for a given circumstance. In addition to the above drawbacks with the prior solutions, this approach has required that the patient have ready access to the document or documents, and that they be in a position to read the material. It is both inconvenient and impractical to expect people to carry with them a set of documents providing guidance for whatever condition they might face at any given time. Further, interacting with a complex set of rules by reading and navigating a book or pamphlet may not be possible in many of the traumatic situations that often exist at the time treatment is desired.

This static approach to diagnosis and treatment based on a pre-defined rule set has had the further drawback of making it difficult to update treatment programs based on unexpected conditions, newly-discovered relevancy of unaccounted-for variables, and/or changes in the medical field relating to the particular condition or treatment. The applicants believe they have discovered that the redistribution of materials and/or continuing education of patients is inconvenient and costly, as well as unreliable given that it requires action on the part of the patients to proactively obtain updates from the educator and/or practitioner, and also relies on action by the educator and/or medical practitioner to continually track patients and notify patients of updates.

BRIEF SUMMARY OF SOME ASPECTS OF THE DISCLOSURE

The applicants believe that they have discovered the problems and issues with prior art systems noted above as well as advantages variously provided by differing embodiments of the behavioral treatment delivery system and method of use disclosed in this specification. It is to be understood that this Brief Summary recites some aspects of the present disclosure, but there are other novel and advantageous aspects. They will become apparent as this specification proceeds.

Briefly and in general terms, the present invention provides a system and method providing the patient or non-professional assistant of the patient with the ability to receive behavioral treatment information and/or education. In some embodiments, a system and method provides interactive behavioral treatment delivery systems that support the suggestion of treatments and interventions that take into account specific external and patient attributes, variables, conditions, and circumstances.

In some embodiments, the interactive behavioral treatment delivery system incorporates a rule-based system that can account for one or more among attributes specific to a given patient, the circumstances relating to a given medical condition or symptom, the conditions and variables external to the patient's state, and the desires and preferences of the patient. Medical practitioners when making decisions regarding the appropriate treatment for a given patient often consider factors such as these. By incorporating parameters such as one or more of these into an interactive rule-based system, some embodiments can provide behavioral guidance to or for a patient (which can be behavioral information provided to a patient assistant for use for the benefit of the patient) without requiring direct interaction with a medical practitioner and/or participation in a patient education program. This can, in certain instances, reduce delays in treatment, reduce the overall treatment costs, and/or increase the sense of control a patient has regarding their treatment. Further, in some applications, this can provide the patient with increased confidence, positive sentiment, and feelings of control when selecting and undergoing treatment.

It is often the case that advances in medicine change the recommended treatment for a specific medical condition or symptom related to a medical condition. In certain embodiments, the interactive behavioral treatment delivery system receives updates to the rule-based logic and content, allowing treatment recommendations to remain current based upon more recent or differing medical research or theories. A further advantage of the update capability can be augmentation of the system with additional structured decision programs and content, which can expand the usefulness of the system to an increasing number of medical conditions. In addition, in some embodiments, practitioners can introduce specific recommendations, rules, and/or application behaviors based on their own practice methodologies or knowledge of a patient.

In certain instances, the interactive behavioral treatment delivery system presents recommendations to one or more patients and/or their assistant's on a mobile device such as, for example, a laptop, a smart or similar phone, or a tablet computer. The portability of such devices increases the likelihood that a patient or patient assistant can have the device, and therefore the behavioral instructional content, in their possession at the moment when a particular need, desire, condition, or symptom appears. Further, these devices can provide improved ease of use as compared to books or other non-interactive content, increasing the likelihood that the patient or patient assistant can obtain the correct treatment guidance while reducing the time required to navigate to the recommendation. In addition, in some embodiments, the recommendations can include patient behavioral instructional videos (which may consist of or include patient behavioral instructional videos providing behavioral video instruction for the benefit of the patient such as to a patient assistant) that play on the device, providing a more effective experience to the patient and improving their ability to properly perform the behavior.

In some embodiments, the interactive behavioral treatment delivery system can be operated and displayed in a system-independent container, such as an Internet browser. This independence, can allow the patient access to the system content from a variety of devices such as, for example, a computer, a mobile device, and/or a television. This increased level of access can allow the patient or the patient's assistant to interact with the content and receive treatment guidance at an appropriate location given their condition or mobility restrictions.

The ability to remind a patient to perform certain activities at specific time intervals can be a valuable aspect of a medical treatment. In some instances the interactive behavioral treatment and delivery system notifies the patient or the patient's assistant to perform certain actions at certain time intervals. In certain of these embodiments, the notification configuration can be tailored for a given patient by the patient, patient assistant, practitioner, researcher, and/or other third party. This customized notification can improve the effectiveness of the overall treatment in general or for a specific patient. Further, this notification function can reduce the burden on a patient to remember one or more activities that should be performed as part of a treatment program.

In some embodiments of the interactive behavioral treatment and delivery system, a database stores the state history and decisions of the patient or the patient's assistant. This information can then be used by a medical practitioner or others to tailor the decision logic and/or content of the system in general or for the specific patient. Further, in some applications, programs can be run that monitor the database for patterns or data that are indicative of something requiring the practitioner and/or another to modify the decision logic or content for a specific patient and/or directly contact the patient. This database can be of any format, such as, for example a relational data store, a set of structured files, and/or a set of flat files.

In some instances, the interactive behavioral treatment and delivery system can obtain and store information relating to physical attributes of the patient such as, for example, blood pressure, through peripheral monitoring devices such as the Withings Blood Pressure Monitor™. This information can then be used directly by a medical practitioner and/or as a data input for a particular rule path in the treatment recommendation decision process.

In certain embodiments, the interactive behavioral treatment and delivery system can store historical information relating to patients' preferences, decisions and treatment results. Historical and statistical data can be retrieved from the data store and/or flat files and analyzed. Analytical models and technologies can then be employed to improve the interactive behavioral treatment and delivery system by, among other things, providing a preference-rated or effectiveness set of options to a patient. Some applications can further provide a statistical grade indicating historical efficacy in situations similar to those that the patient is experiencing, possibly improving the quality of the treatment selection process and/or increasing the patient's confidence in the selection.

Some applications provide a behavior based birthing assistance implementation supporting one or more laboring women and/or their assistants during labor. Some applications can instill confidence and comfort, thus improving the birthing process.

In some applications, system the can recognize the needs of the woman and provide teaching strategies to quickly demonstrate effective behavioral coping techniques for a variety of challenges experienced during labor. Further real time visual graphics can show the patient what is occurring in their body and/or also motivate them to continue on with their labor by showing them how far they have progressed. In some applications, these graphics can be provided to instill confidence in, and/or render more efficient or effective, natural childbirth in contrast to more invasive procedures such as, for example, cesarean delivery.

BRIEF DESCRIPTION OF THE DRAWINGS

The preferred and other embodiments are shown in the accompanying drawings in which:

FIG. 10 is a screen capture of the Copyright View of FIG. 5 according to an exemplary embodiment disclosed herein;

FIG. 28 is the contraction data portion of the session log included in the email of FIG. 26 according to an exemplary embodiment disclosed herein;

FIG. 30 is the navigation and update data portion of the session log included in the email of FIG. 26 according to an exemplary embodiment disclosed herein;

FIG. 32 is the top two levels of the property list hierarchy for populating the selection lists in the selection views of FIG. 7 according to an exemplary embodiment disclosed herein;

FIG. 33 is the key-value pair list from the property list for a subset of the key values in the property list hierarchy of FIG. 31 according to an exemplary embodiment disclosed herein;

FIG. 41 is a screen capture of the Post Contraction Survey View of FIG. 8 according to an exemplary embodiment disclosed herein;

FIG. 43 is a screen capture of the Supportive Words View of FIG. 6 according to an exemplary embodiment disclosed herein;

DETAILED DESCRIPTION OF THE PREFERRED AND OTHER EMBODIMENTS

Figure 1:
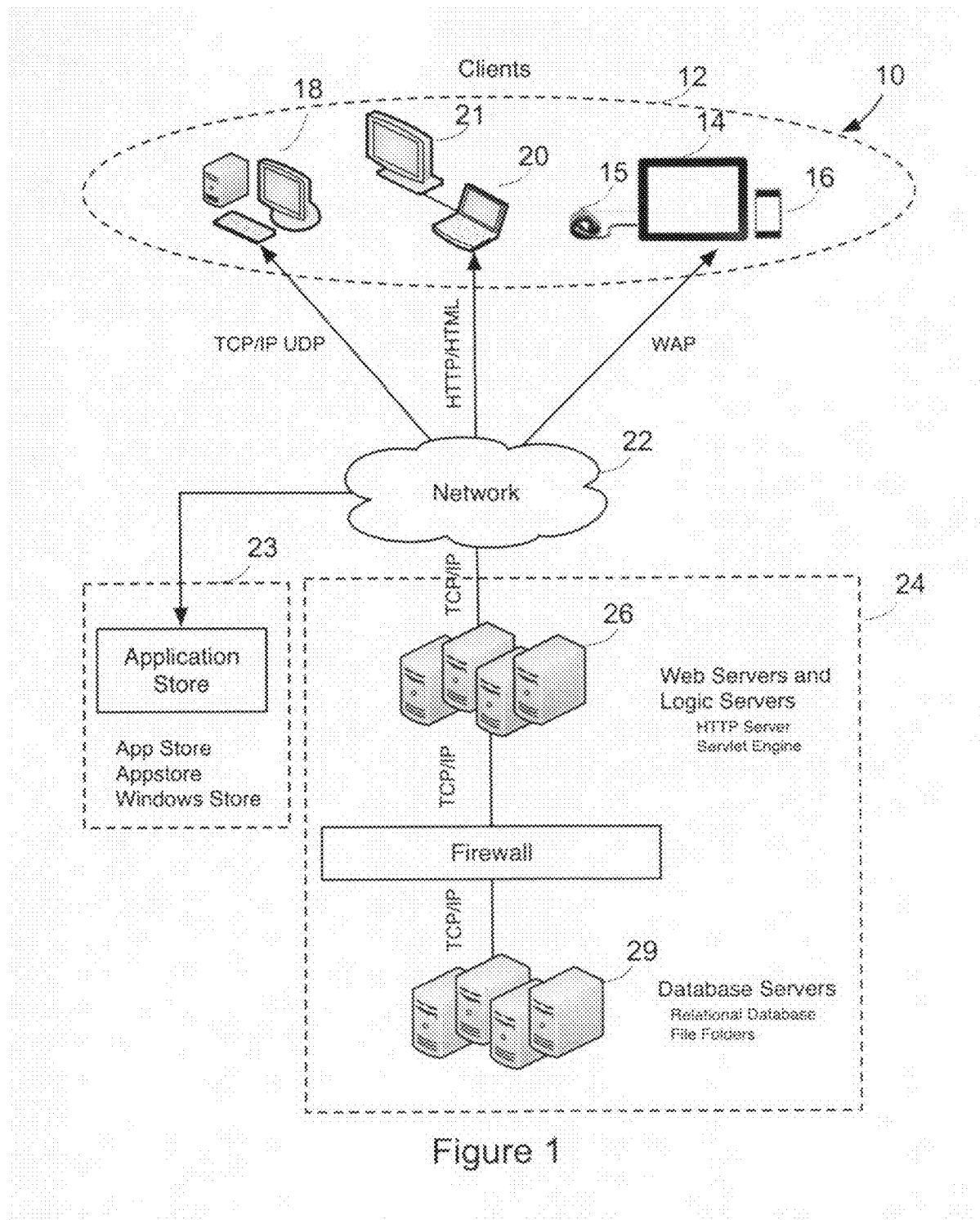
FIG. 1 is a computer network or similar digital processing environment in which an interactive behavioral treatment delivery system can be implemented.

Broadly, this disclosure is directed towards a method and system for interactive delivery of behavioral medical treatment. The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Certain embodiments of the Interactive Behavioral Treatment Delivery System And Method Of Use are described with reference to methods, apparatus (systems) and computer program products that can be implemented by computer program instructions. These computer program instructions can be provided to a processor of a general purpose computer, special purpose computer, mobile computing device, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction means which implement the acts specified herein. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified herein.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices such as, for example, a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a computer terminal. In the alternative, the processor and the storage medium can reside as discrete components in a computer terminal.

Depending on the embodiment, certain acts, events, or functions of any of the methods described herein can be performed in a different sequence, can be added, merged, or left out all together (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially. Moreover, in certain embodiments, acts or events can be performed on alternate tiers within the architecture.

With reference to FIG. 1, a computer network or similar digital processing environment 10 in which the system and method disclosed can be implemented. The present systems and methods can also run on different architectures that include a LAN, WAN, stand-alone PC, stand-alone mobile device, a stand-alone, clustered, or networked mini or mainframe computers, etc. The interactive behavioral treatment delivery system and method of use can be distributed on multiple computers and devices 12, 26, 29 according to an exemplary embodiment.

Figure 2:
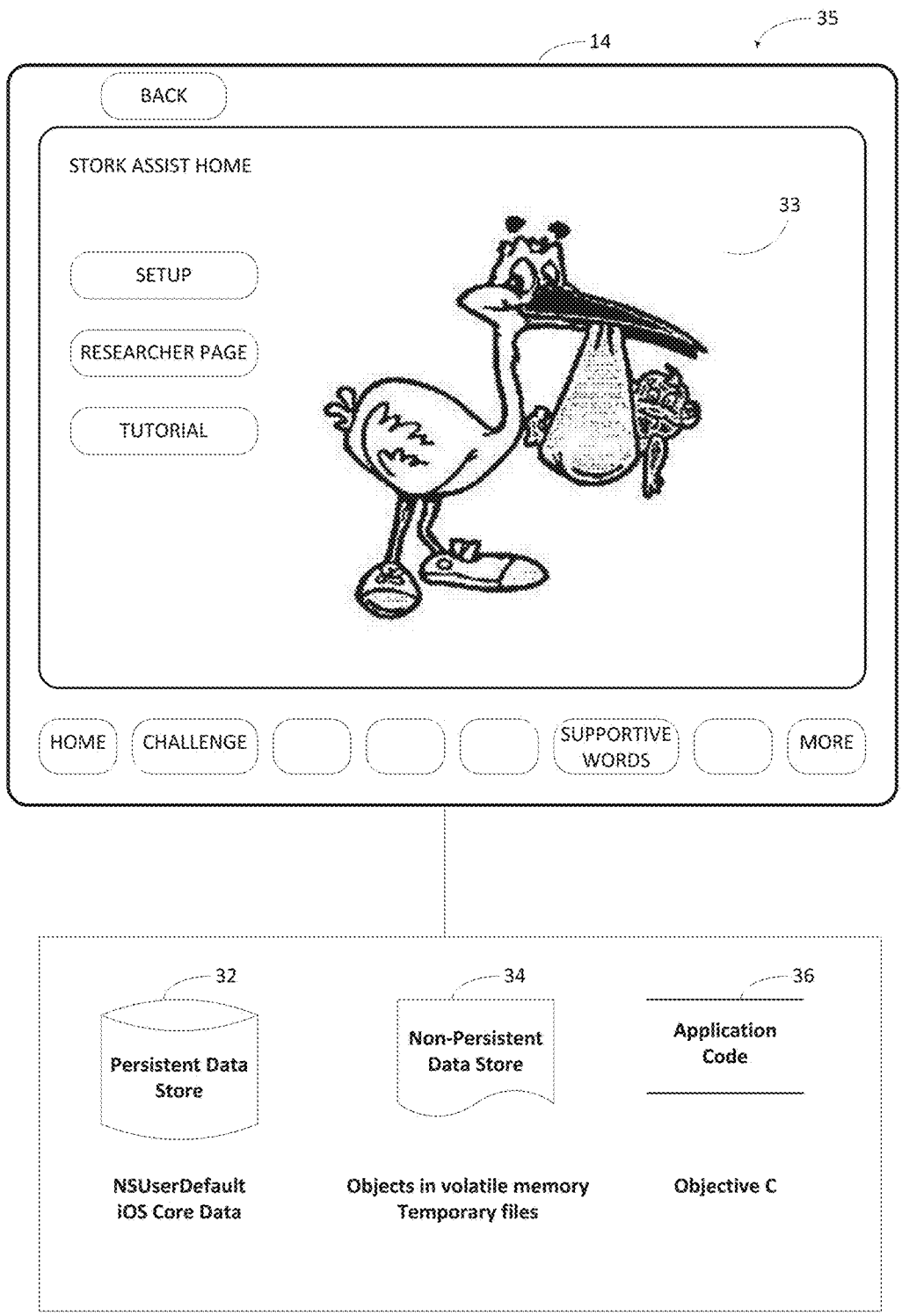
FIG. 2 is a stand-alone digital processing environment in which an interactive behavioral treatment delivery system can be implemented.

FIG. 1 and FIG. 2 are representative of many specific computing arrangements that can support the system and method disclosed. In one embodiment, the software 36 implementing the interactive behavioral treatment delivery system runs in the iOS® environment. In another embodiment, the software is implemented to run in other environments, such as Windows®, UNIX®, Linux®, or in any hardware having enough power to support timely operation of the software shown in FIG. 1 and/or FIG. 2.

With reference to FIG. 1, client computers of various types 12 can connect to a remote server infrastructure 24 via a network 22 over a communication protocol. All computers can pass information as unstructured data, structured files, structured data streams such as XML, structured data objects and/or structured messages. All client computers 18, 20, 14, 16 may support connections to external devices such as external displays 21 and biometric data collection devices 15. In some embodiments, the width of the mobile device 14, 16 can range from about 60 mm to 195 mm, the height can range from about 110 mm to 275 mm, and/or the weight can range from about 100 g to 2000 g.

Client computer(s) and devices 18, 20, 14, 16 and server computer(s) 26, 29 provide processing, storage, and input/output devices executing application programs. Client computer(s) 12 can run both a behavior treatment delivery application and proprietary biometric device software applications 15. Client computer(s) 12 can also be linked through communications network 22 to other computing devices, including other client devices/processes 12 and server computer(s) 26, 29. In some embodiments, server computer(s) 26, 29 run software to implement centralized persistent data storage and retrieval. In other embodiments, client computer devices 12 can maintain a local persistent data store 32. The network 22 can be a local area network and/or a wide area network that is part of a remote access network, a global network (e.g., the Internet), a worldwide collection of computers, and/or gateways that currently use respective protocols (TCP/IP, UDP, etc.) to communicate with one another. Multiple client computer devices 12 may each execute and operate instances of the behavior treatment delivery application simultaneously. In some embodiments, the behavior treatment delivery application system may include a connection to an application store 23 that can provide application and content updates to the behavior treatment delivery application, database and/or both.

On reading this disclosure, those of skill in the art will recognize that many of the components discussed as separate units may be combined into one unit and an individual unit may be split into several different units. Further, the various functions could be contained in one computer or spread over several networked computers and/or devices. The identified components may be upgraded and replaced as associated technology improves and advances are made in computing technology.

With reference now to FIG. 2, in some embodiments, the behavior treatment delivery application can operate in a stand-alone mode as a native application 35 providing user interface views 33, a persistent data store 32, a non-persistent data store 34, and/or application logic 36. The native application may operate on a smart mobile device such as, for example, a tablet 14 or other client computer 12.

In the case of iOS™, for example, the persistent data store 32 can be implemented locally using NSUserDefaults and/or iOS™ Core Data methods. The non-persistent data store 34 can be implemented through, for example, the generation of temporary files and/or maintaining objects in volatile memory. Objective C or other compatible application code 36 can be used to implement the application logic. Those skilled in the art will recognize that the application could be implemented in other programming languages, such as, for example JavaScript, where the functionality may still operate in a stand-alone mode but without being categorized as a native application.

In some embodiments, the client computer device may include an input device such as, for example, a touch screen interface, voice recognition interface, and/or a keyboard, and may also have a communications interface to one or more biometric collection devices compatible with the specific computer device and appropriate for purposes of the particular application implemented. Standard and propriety interfaces to, for example, blood pressure monitors, and contraction monitors, can readily be integrated with, and where necessary licensed for, use with a behavior based treatment delivery application.

Figure 3:
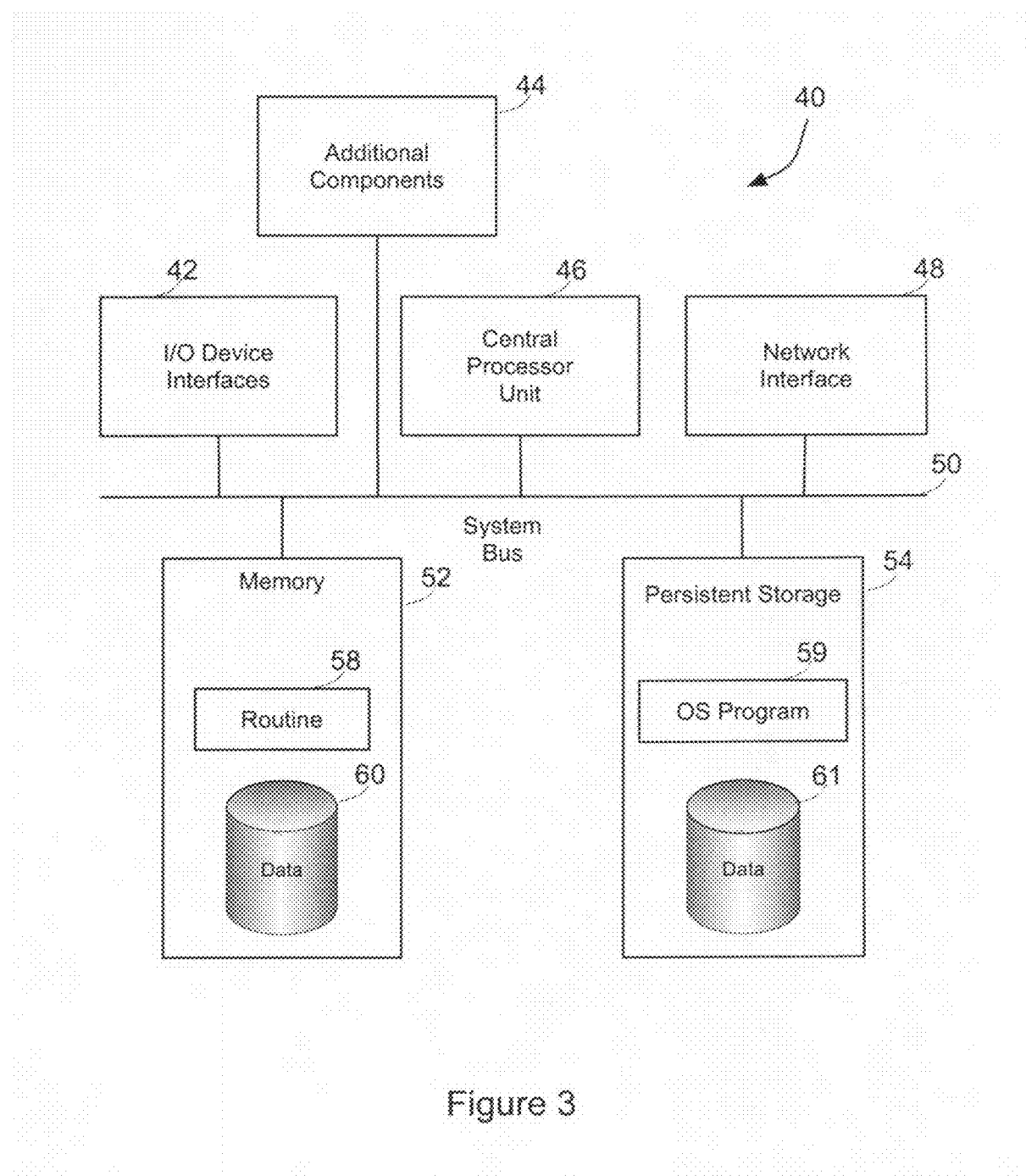
FIG. 3 is a block diagram of the internal structure of a computer (e.g., client processor/device 12 or server computers 26, 29) used in the computer network of FIG. 1 and FIG. 2.

With reference to FIG. 3, each component of the system 40 is connected to system bus 50, providing a set of hardware lines used for data transfer among the components of a computer or processing system. Also connected to bus 50 are additional components 44 of the interactive behavioral treatment delivery system, such as additional memory storage, digital processors, network adapters and I/O devices. Bus 50 is essentially a shared conduit connecting different elements of a computer system (e.g., processor, disk storage, memory, input/output ports, network ports, etc.) and enabling transfer of information between the elements. I/O device interface 42 is attached to system bus 50 in order to connect various input and output devices (e.g., keyboard, mouse, touch-screens, displays, printers, speakers, etc.) to the interactive behavioral treatment delivery system. Network interface 48 allows the computer to connect to various other devices attached to a network (e.g., network 22 of FIG. 1). Memory 52 provides volatile storage for computer software instructions 58 and data 60 used to implement methods employed by the system disclosed herein. Disk storage 54 provides non-volatile storage for computer software instructions 59 and data 61 used to implement an embodiment of the present disclosure. Central processor unit 46 is also attached to system bus 50 and provides for the execution of computer instructions.

In one embodiment, the processor routines 58 and data 60 are a computer program product, including a computer readable medium (e.g., a removable storage medium such as one or more DVDROM's, CD-ROM's, diskettes, tapes, etc.) that provides at least a portion of the software instructions for the system. Computer program product that combines routines 58 and data 60 may be installed by any suitable software installation procedure, as is well known in the art. In another embodiment, at least a portion of the software instructions may also be downloaded over a cable, communication and/or wireless connection.

In some embodiments, a Model-View-Controller design pattern implements the interactive behavioral treatment delivery system, assigning objects in the system to one of three roles: model, view, or controller. The pattern defines not only the roles objects play in the application, but it also defines the way objects communicate with each other.

Figure 4:
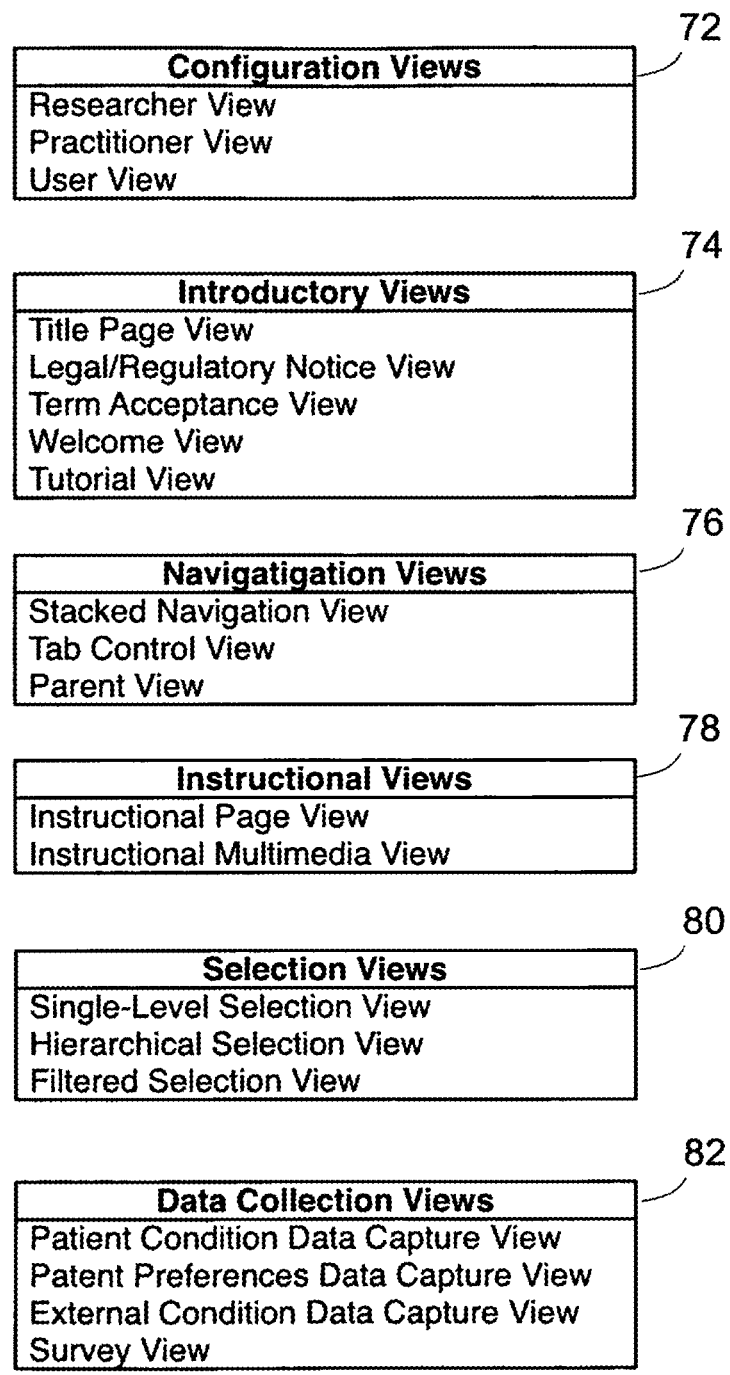
FIG. 4 is diagram of the view categories of the interactive behavioral treatment delivery system according to an exemplary embodiment disclosed herein.

With reference now to FIG. 4, in some embodiments, the interactive behavioral treatment delivery system generates and maintains one or more views representing different view types or view categories. A view is an object in the interactive behavioral treatment delivery system that a user can see. A view knows how to render itself and can respond to user actions. The view displays data from the application's model objects and to enables the editing of that data. The view objects learn about changes in model data through view controller objects and communicate user-initiated changes such as, for example, text entered in a text field, through controller objects to an interactive behavioral treatment delivery system's model objects.

Configuration views 72 are views that provide an interface to access and/or modify the configuration of the system. In certain instances, there can be multiple configuration views tailored to the roles and interests of a particular type of user of the system. For example, the parameters of interest to a medical practitioner can be different than those of interest to the patient or patient assistant using the system. Similarly, in some embodiments, there can be customized configuration views designed for researchers to collect and transfer data relevant to one or more research projects.

In some embodiments, the interactive behavioral treatment delivery system includes one or more introductory views 74. These views can be displayed prior to executing the core system functionality. Introductory views can include various kinds of information and serve a variety of purposes such as, for example, branding, legal and regulatory notification, acceptance of terms and conditions, welcome messages, and/or tutorials. In certain of these embodiments, one or more of these introductory views can be bypassed, while in other instances, the system may force the display of one or more of these views.

In certain instances, navigation views 76 can be used for interactive navigation of views. Navigation views 76 can include, for example a parent view with embedded navigation controls to other embedded views, a tab control view enabling direct jumps to specific views, and/or a stacked navigation view enabling traversal through a hierarchical stack of views.

In certain embodiments, instructional views 78 can provide treatment guidance and information to the patient or patient assistant. These views can include, for example, static information such as text and/or multimedia content such as video. This instructional content can be stored as static information in a local data store and/or obtained dynamically through methods such as, for example, embedded displays of videos hosted on remote computer devices.

Selection views 80 can provide an interface to collect decisions and preferences of a patient or patient assistant that can then be stored and/or used as part of the application logic to, for example, filter the accessible set of views. Selection views 80 can include, for example, a single level selection view, a hierarchical set of selection views where the set of selections is filtered successively based on the selection in the prior view of a view stack, and/or a filtered selection view where the selections within the view are filtered dynamically as individual selections are made.

In some instances, data collection views 82 prompt for and/or obtain information from the patient or patient's assistant. This data can include, for example, information on the patient condition or patient preferences, information on conditions external to the patient, and/or survey information. In some of these embodiments, the view controllers associated with the data collection views 82 can communicate with peripheral devices such as blood pressure monitoring devices 15 to obtain patient condition information.

Figure 5:
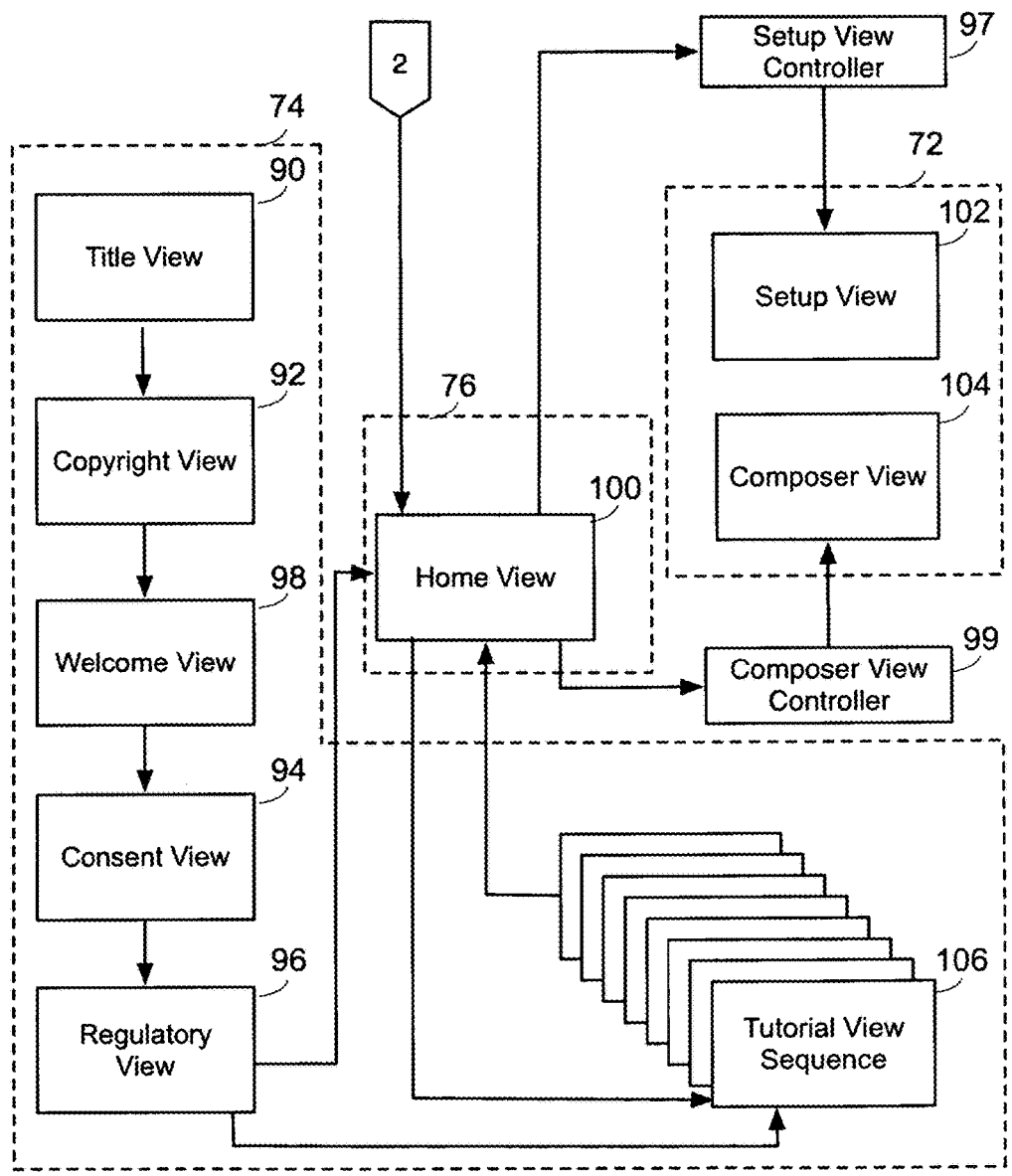
FIG. 5 is a block diagram of the initial views of an interactive behavioral treatment delivery system according to an exemplary embodiment disclosed herein.

With reference now to FIG. 5, in some embodiments, a sequential series of introductory views 74 are generated. These views can include, for example, a Title View 90 that includes an application title and branding, a Copyright View 92 displaying copyright and/or other legal notices to the user, a Welcome View 98 displaying information explaining consents and waivers, a Consent View 94 requesting acknowledgement from a user authorizing certain activities, and a Regulatory View 96 displaying pertinent regulatory information. In some embodiments, these views are displayed each time an instance of the application is initiated. In other embodiments, the viewing and authorization activity of a user is logged to a persistent data store on the local device or on a remote device and the introductory views are bypassed upon subsequent application execution. In certain instances, one or more tutorial views 106 provide guidance in how to use the application.

In some embodiments, a navigation view 76, such as, for example, a Home View 100, can provide a baseline navigation point for accessing the various view paths and application functionality of the behavior treatment deliver system. In some instances, one or more Configuration Views 72 are accessible from the Home View 100. A Setup View 102 generated by a Setup View Controller 97, and a Composer View 104 generated by a Composer View Controller 99 can provide access to configuration parameters regulating the operation of the application. In some instances, the Setup View 102 exposes configuration parameters the patient or patient's assistant modifies, and the Composer View 104 exposes configuration parameters a medical practitioner or researcher modifies. Either or both of these configuration views can be implemented to require authentication prior to allowing access to the view, modification of the configuration parameters, and/or executing a save event.

Figure 6:
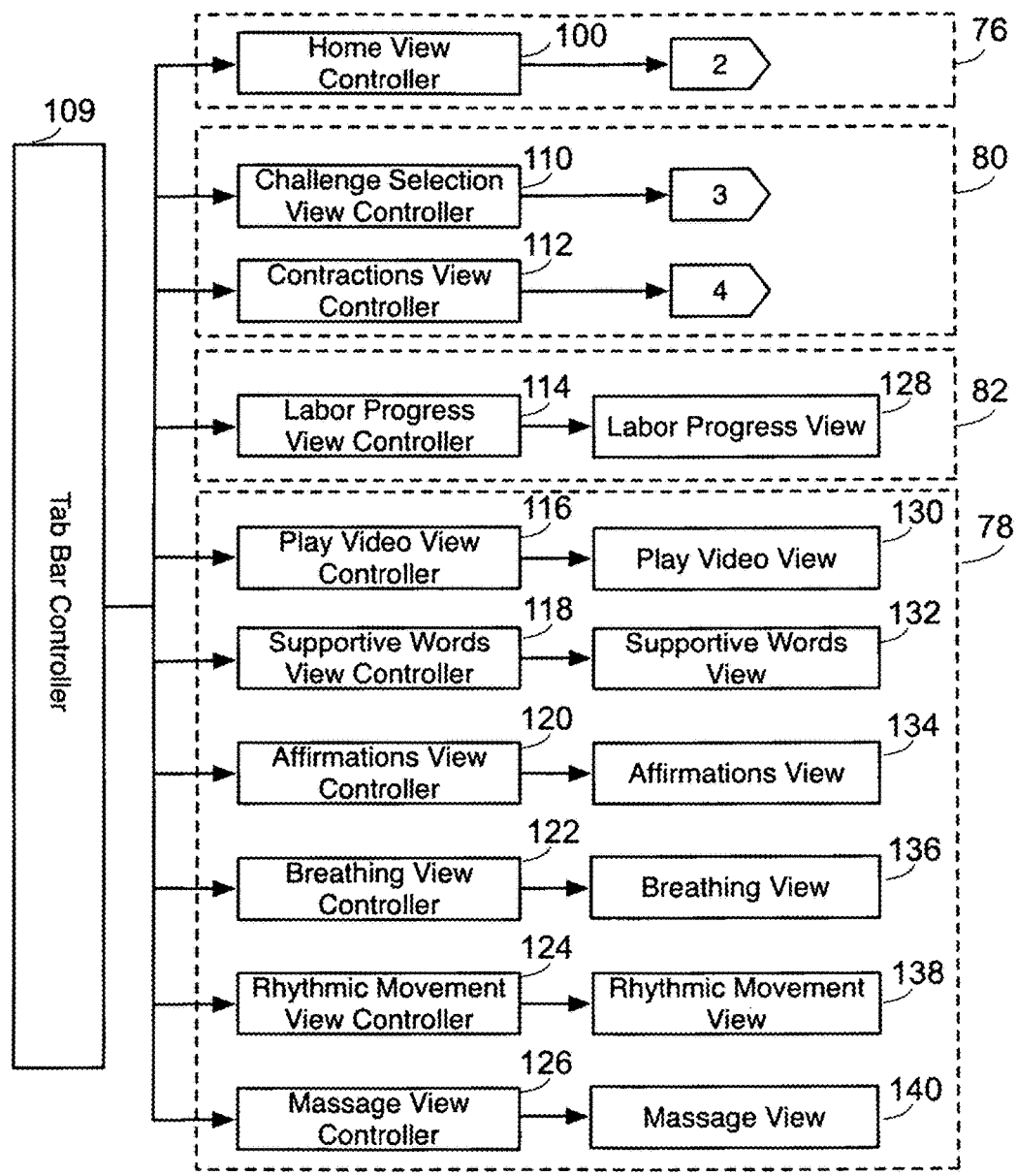
FIG. 6 is a block diagram of a tab controller with the associated view controllers and views of the interactive behavioral treatment delivery system according to an exemplary embodiment disclosed herein.

With reference now to FIG. 6, one example of an interactive behavioral treatment delivery system is a behavior based birthing assistance application providing assistance to expectant mothers and their assistants, partners, or both. The Tab Bar Controller 109 for this example is a container view controller that has one or more tabs, each represented by a child view controller. When a tab selection event is detected, the Tab Bar Controller 109 displays the associated view controller's view on the screen. The view controller objects provide the infrastructure for managing content and for coordinating the showing and hiding of content in the associated views. The view controller objects act as intermediaries between one or more of the view objects and one or more of the model objects. The controller objects are a conduit through which the view objects can learn about changes in the model objects and vice versa. The controller objects can interpret user actions made in the view objects and communicate new or changed data to the model objects. When model objects change, the controller objects communicate that new model data to the view objects. In some embodiments, the Tab Bar Controller 109 has tabs associated with one or more Selection View Controllers 110, 112 that display Selection Views 80. The Tab Bar Controller 109 can also have tabs associated with controllers generating and modifying data collection views 82 and instructional views 78. The Tab Bar Controller 109 can provide a tab associated with the Home View 100 providing access to a central navigation view 76.

Figure 7:
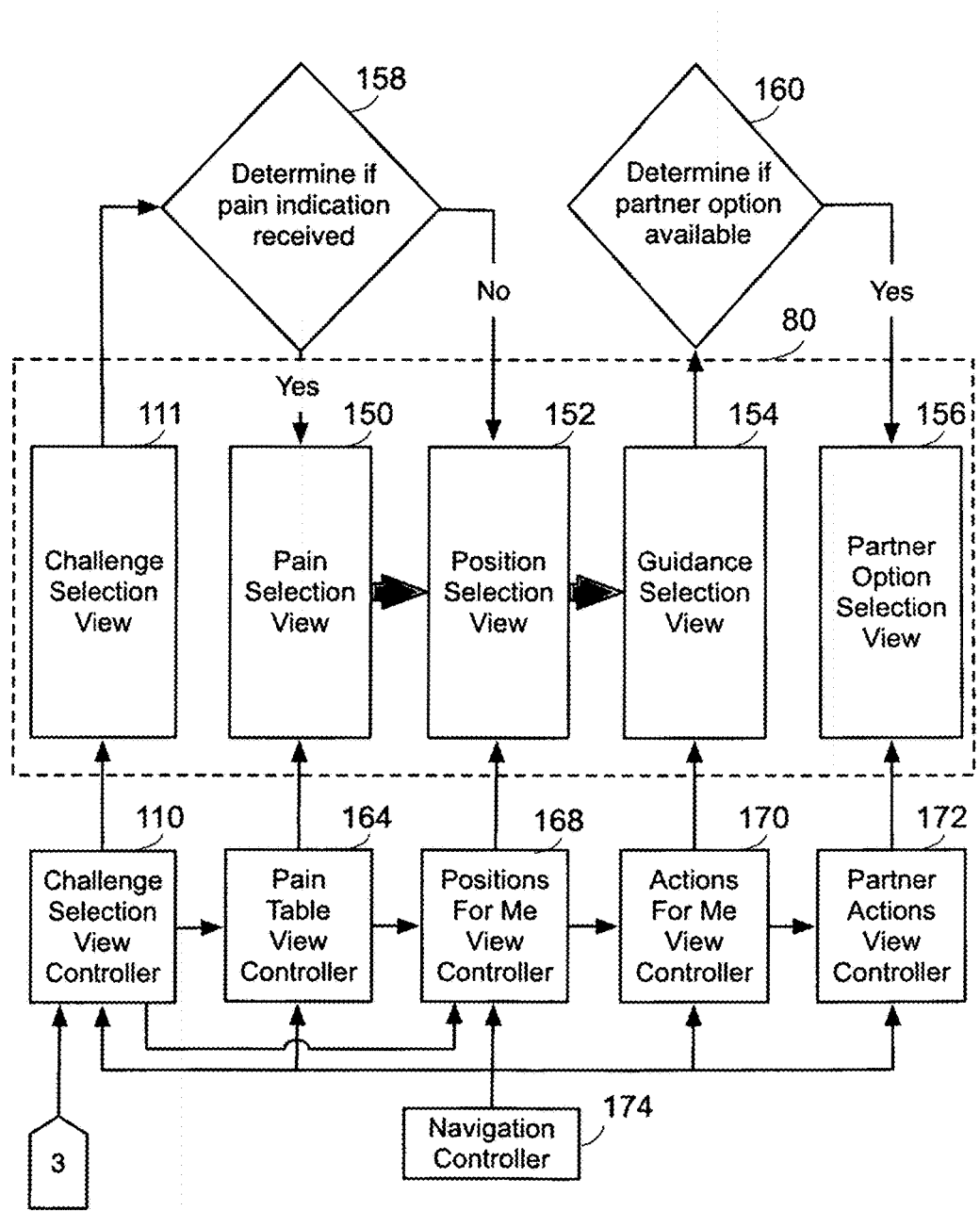
FIG. 7 is a block diagram of a hierarchical set of controllers and views initiated from the Challenge Selection View Controller of FIG. 6 according to an exemplary embodiment disclosed herein.

With reference now to FIG. 7, the behavior based birthing assistance example includes a series of hierarchical selection views 80 that provide the system with information to determine one or more appropriate treatment recommendations. A tab on the Tab Bar Controller 109 directs the Tab Bar Controller 109 to communicate with the Challenge Selection View Controller 110, which in turn displays the Challenge Selection View 111. If a selection is detected by the Challenge Selection View Controller 110 indicating the patient is experiencing pain 158, then the Challenge Selection View Controller 110 directs the Pain Table View Controller 164 to display the Pain Selection View 150. If no selection is detected that indicates the patient is experiencing pain 158, then the Pain Table View Controller 164 is not contacted and the Pain Selection View 150 is not instantiated. Instead, the Challenge Selection View Controller 110 directs the Positions For Me View Controller 168 to display the position selection view 152. The selections in the Positions For Me View 152 are filtered based on the selection detected in the Challenge Selection View Controller 110, which is passed to the Positions For Me View Controller 168. The Positions For Me View Controller 168 then directs the Actions For Me View Controller 170 to display the Guidance Selection View 154. The selections in the Guidance Selection View 154 are filtered based on the selections detected in the previous selection views, which are passed to the Actions For Me View Controller 170. In some embodiments, configuration settings are referenced to determine if, for example, certain equipment is available to the patient that might be included in one or more treatment options. The Actions For Me View Controller 170 can determine if there are partner options available 160. If there are options available, then the Partner Action View Controller 172 can be directed to display the Partner Option Selection View 156. For each view, the Navigation Controller 174 can provide indicia of location in the stack and navigation controls in order to traverse the set of views. A navigation controller 174 presents data that is organized hierarchically and in some embodiments. The methods of this class provide support for managing a stack-based collection of content view controllers that generate views such as, for example, the instructional views 78, the selection views 80, and the data collection views 82. This stack represents the path taken by the patient or patient assistant through the hierarchical data, with the bottom of the stack reflecting the starting point and the top of the stack reflecting the patient's or patient assistant's current position in the data.

In addition to managing child view controllers, a navigation controller 174 can also manage it's own views. More particularly, it can manage a navigation bar 908 that displays information about the patient's or patient assistant's current location in the data hierarchy, a button for navigating back to previous views 909, and any custom controls the current view controller needs.

Figure 8:
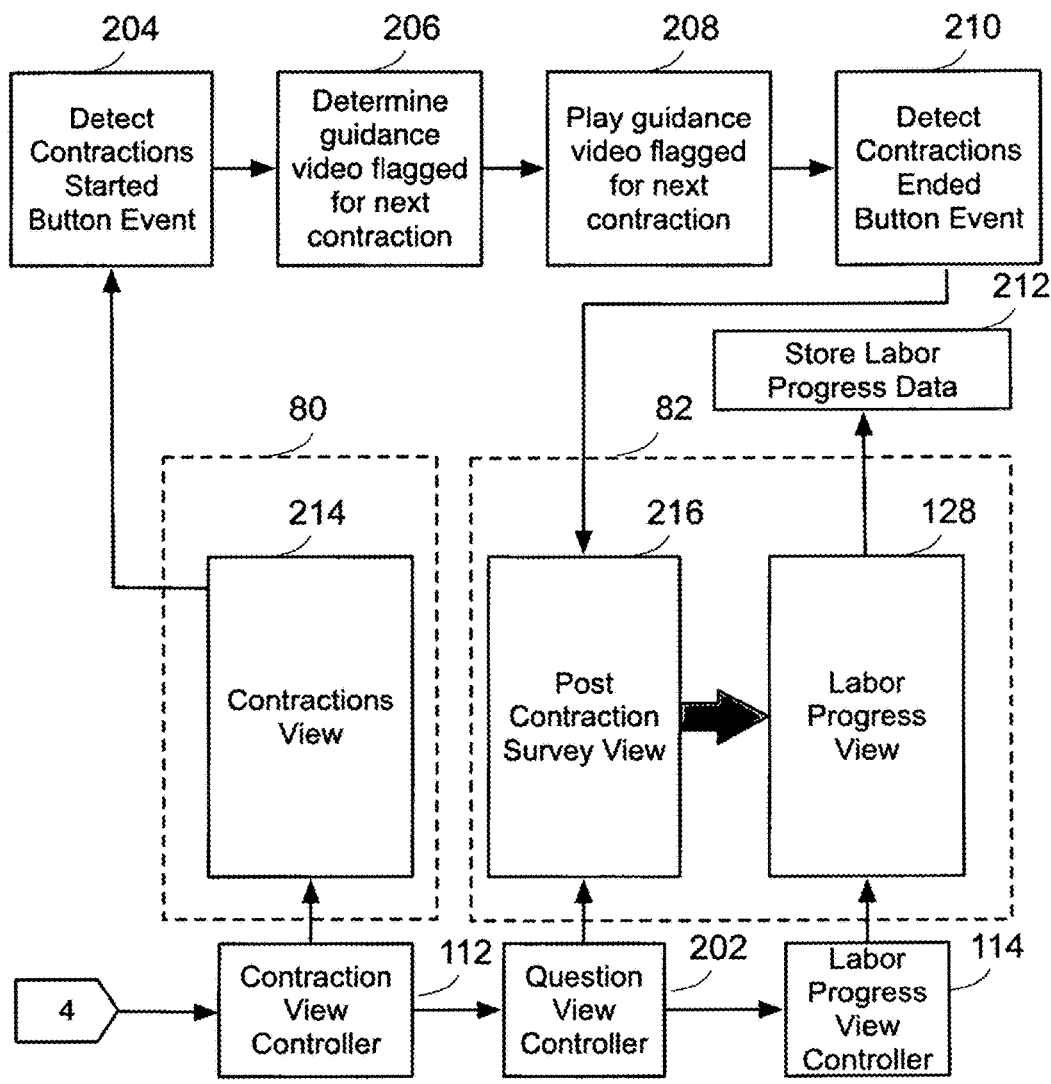
FIG. 8 is a block diagram of a hierarchical set of controllers and views initiated from the Contractions View Controller of FIG. 6 according to an exemplary embodiment disclosed herein.
Figure 9:
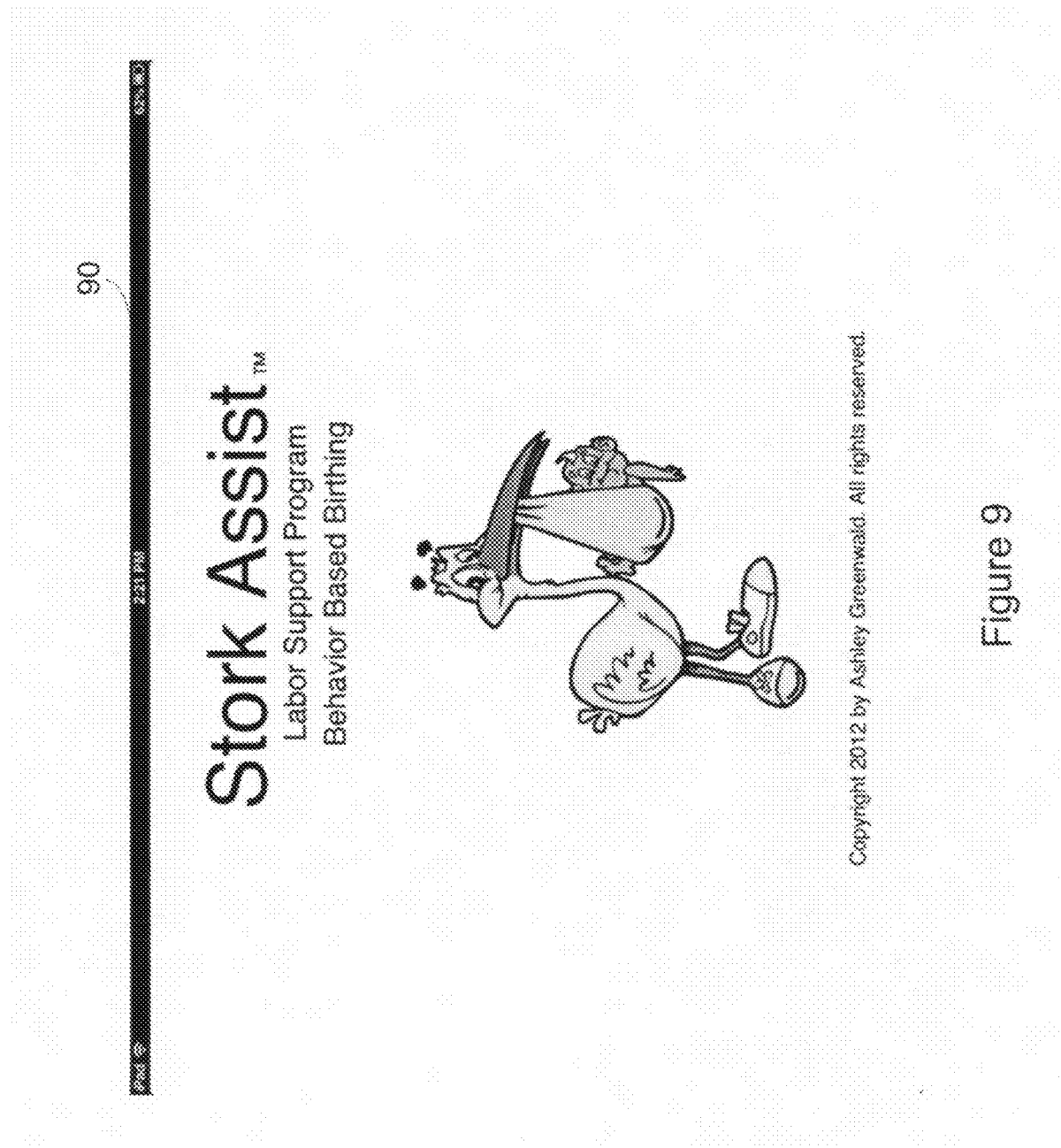
FIG. 9 is a screen capture of the Title View of FIG. 5 according to an exemplary embodiment disclosed herein.
Figure 11:
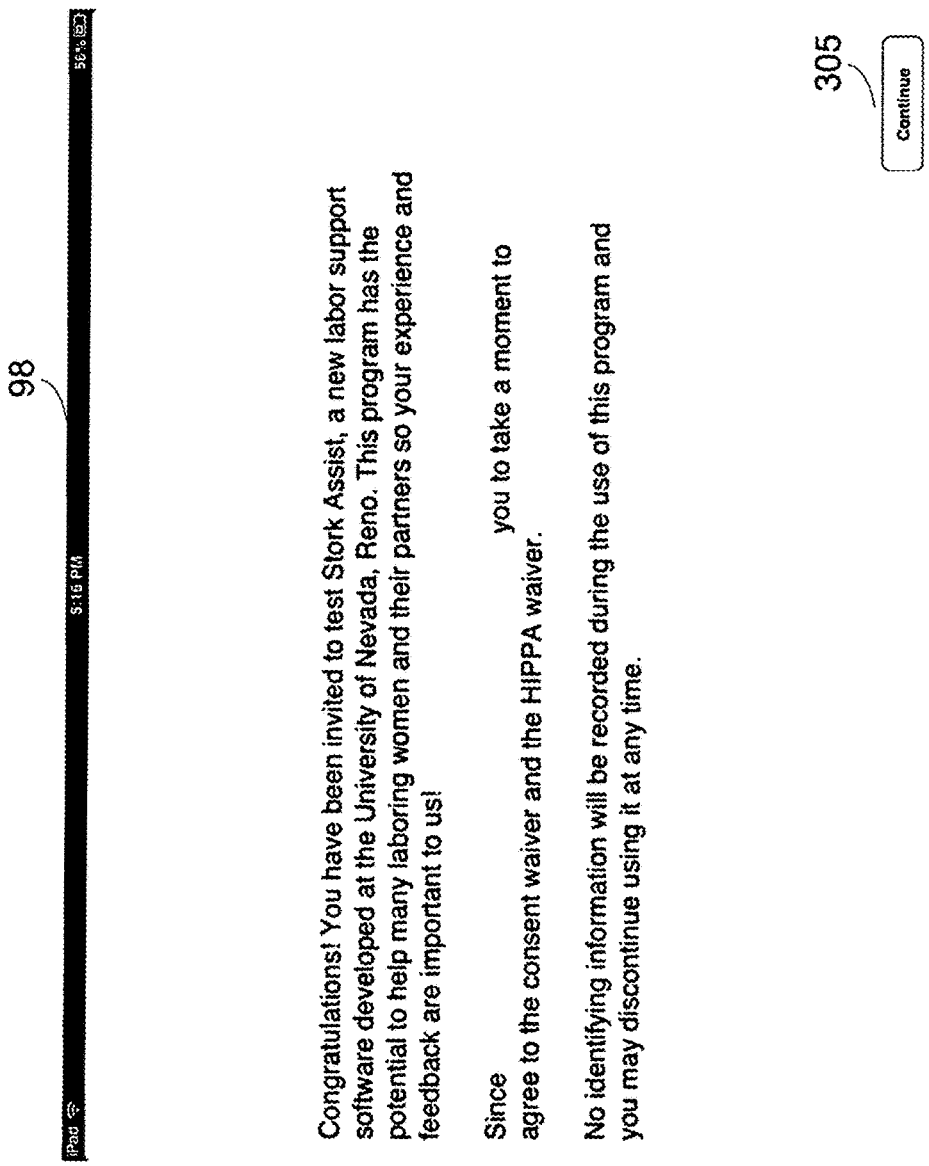
FIG. 11 is a screen capture of the Welcome View of FIG. 5 according to an exemplary embodiment disclosed herein.
Figure 12:
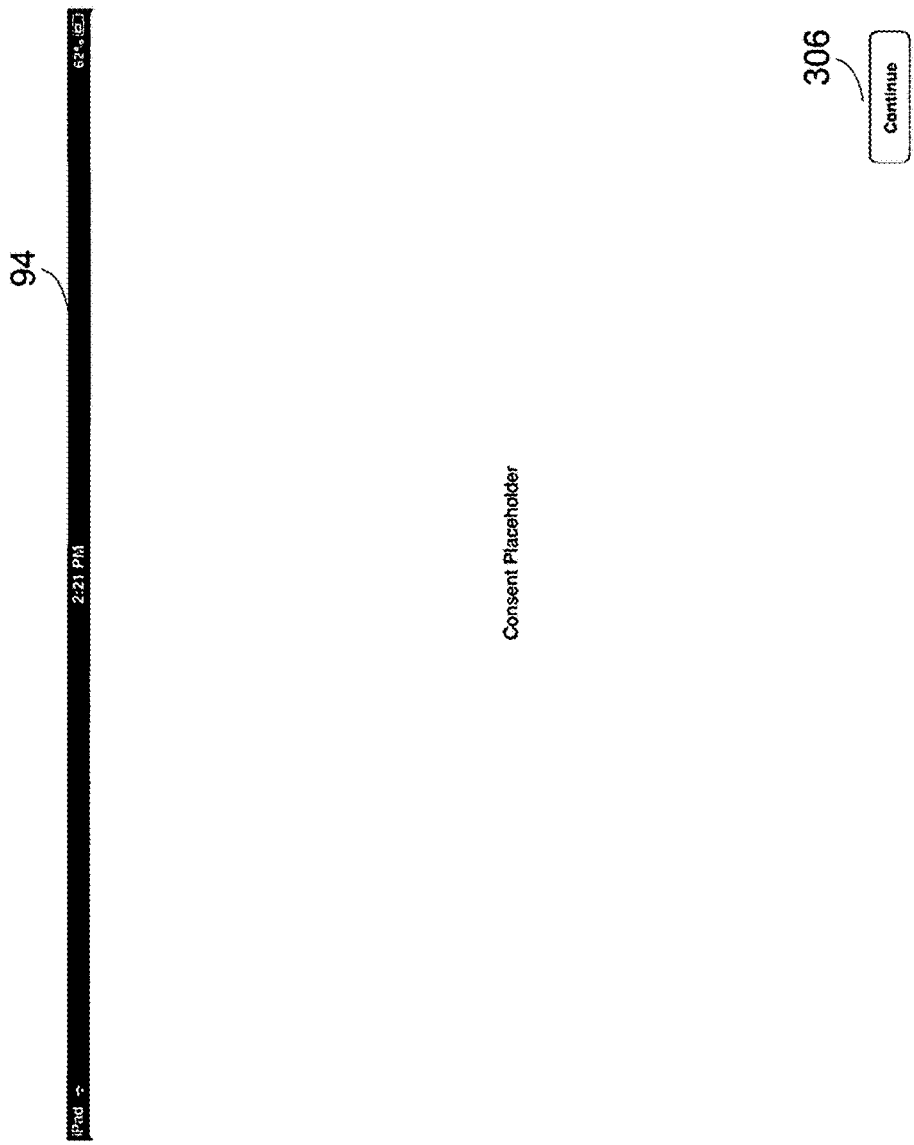
FIG. 12 is a screen capture of the Consent View of FIG. 5 according to an exemplary embodiment disclosed herein.
Figure 13:
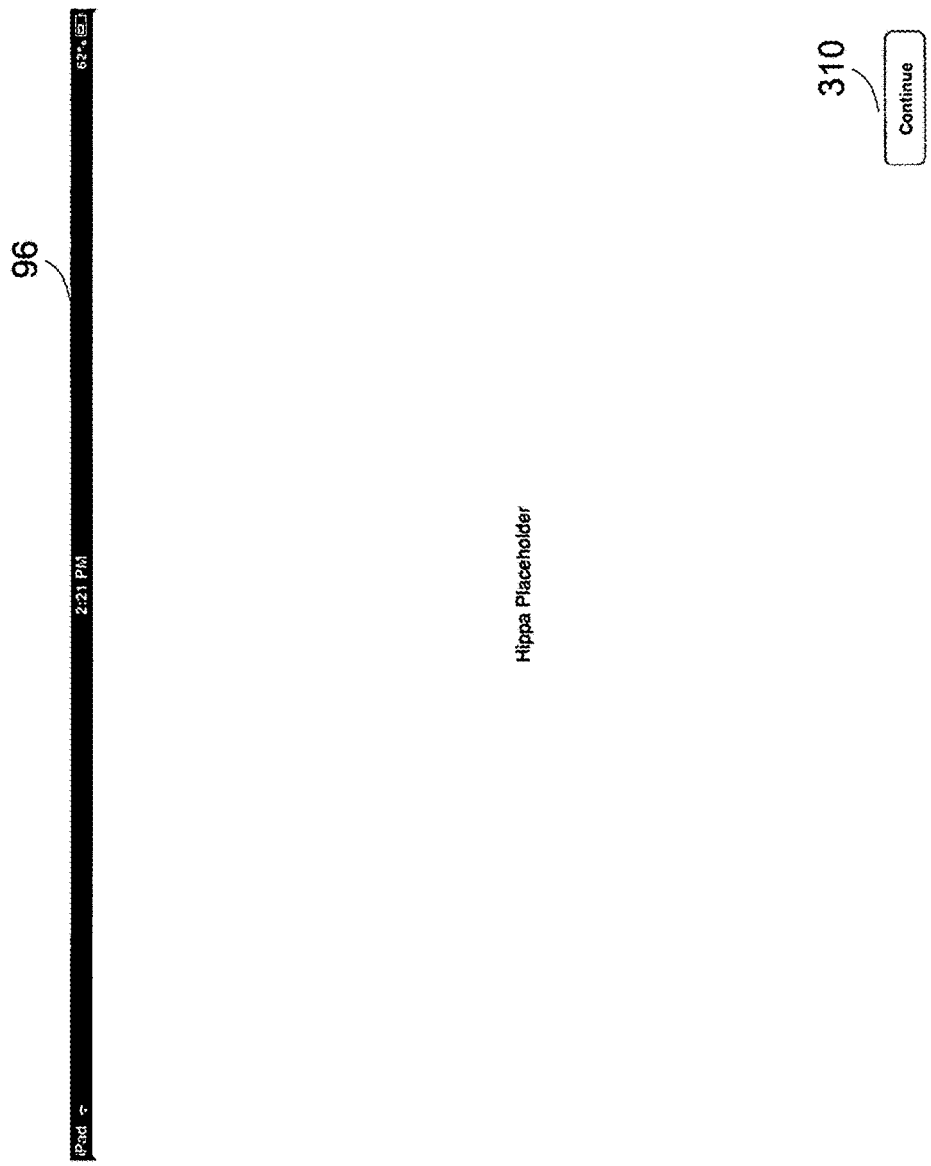
FIG. 13 is a screen capture of the Regulatory View of FIG. 5 according to an exemplary embodiment disclosed herein.
Figure 14:
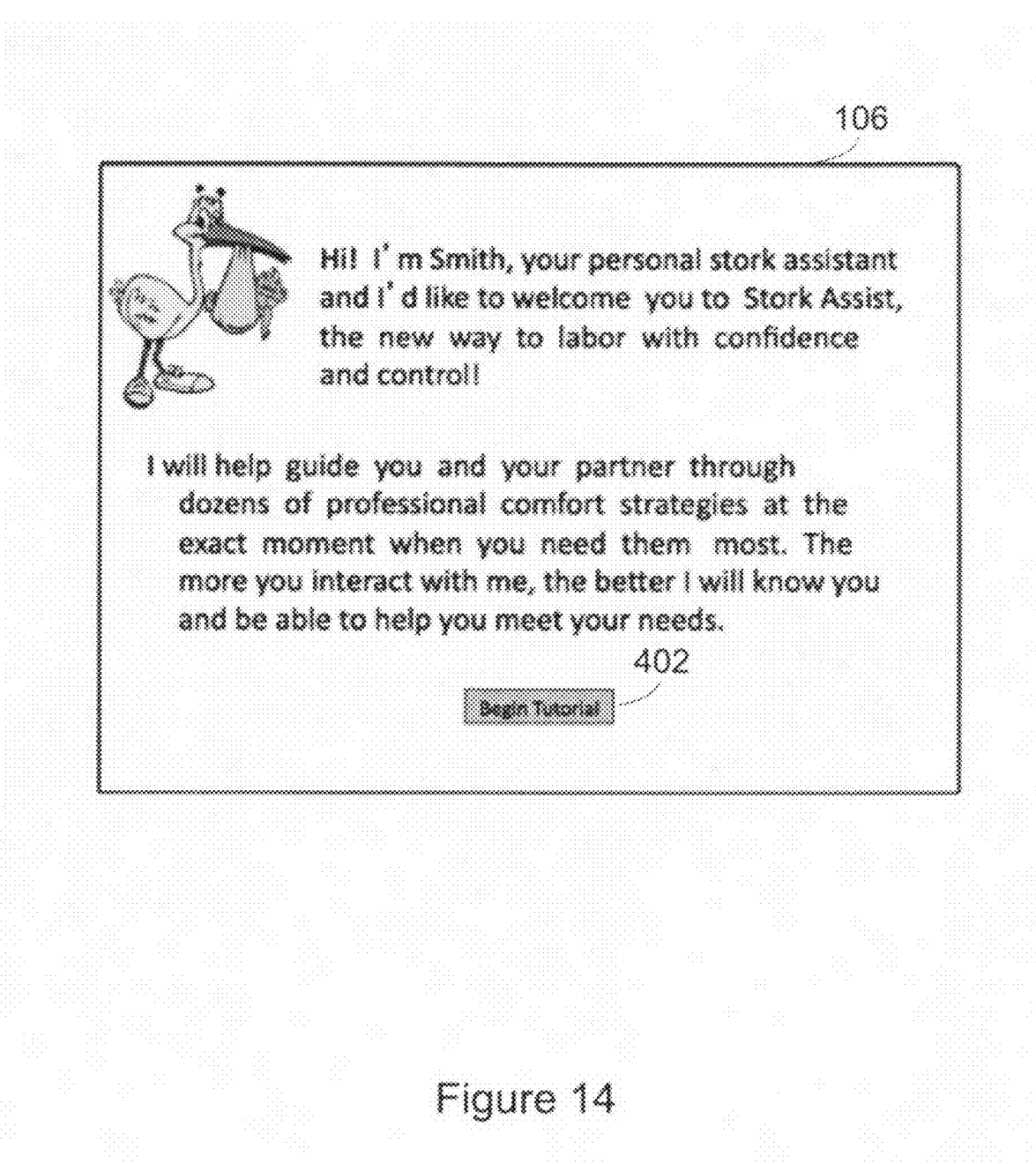
FIG. 14 is a screen capture of the first view of the Tutorial View Sequence of FIG. 5 according to an exemplary embodiment disclosed herein.
Figure 15:
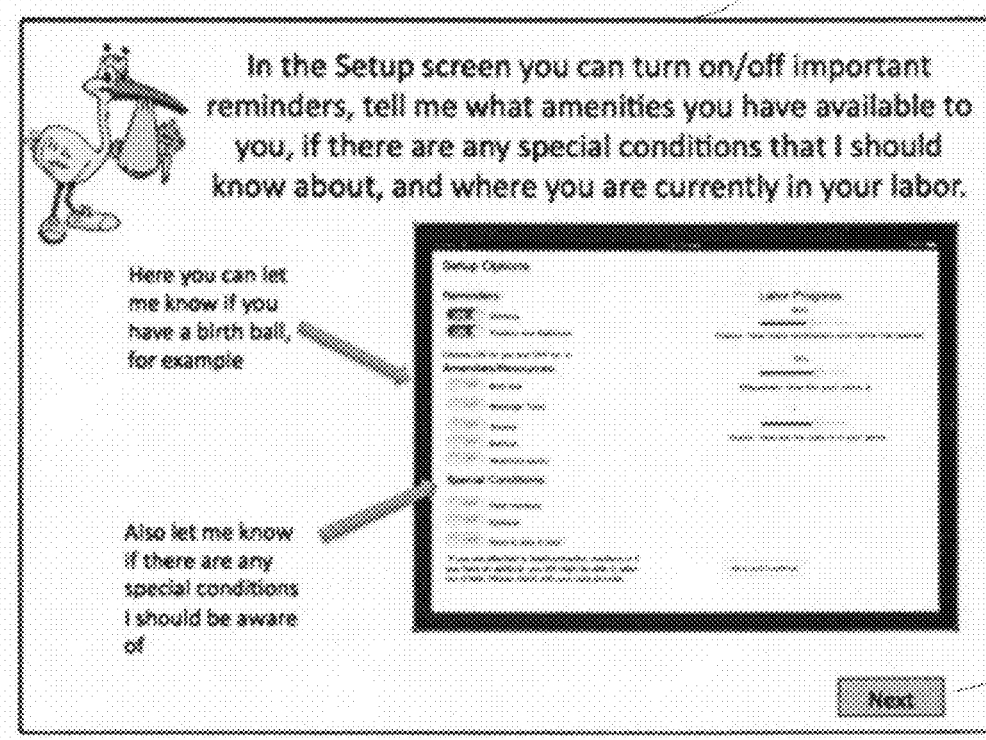
FIG. 15 is a screen capture of the second view of the Tutorial View Sequence of FIG. 5 according to an exemplary embodiment disclosed herein.
Figure 16:
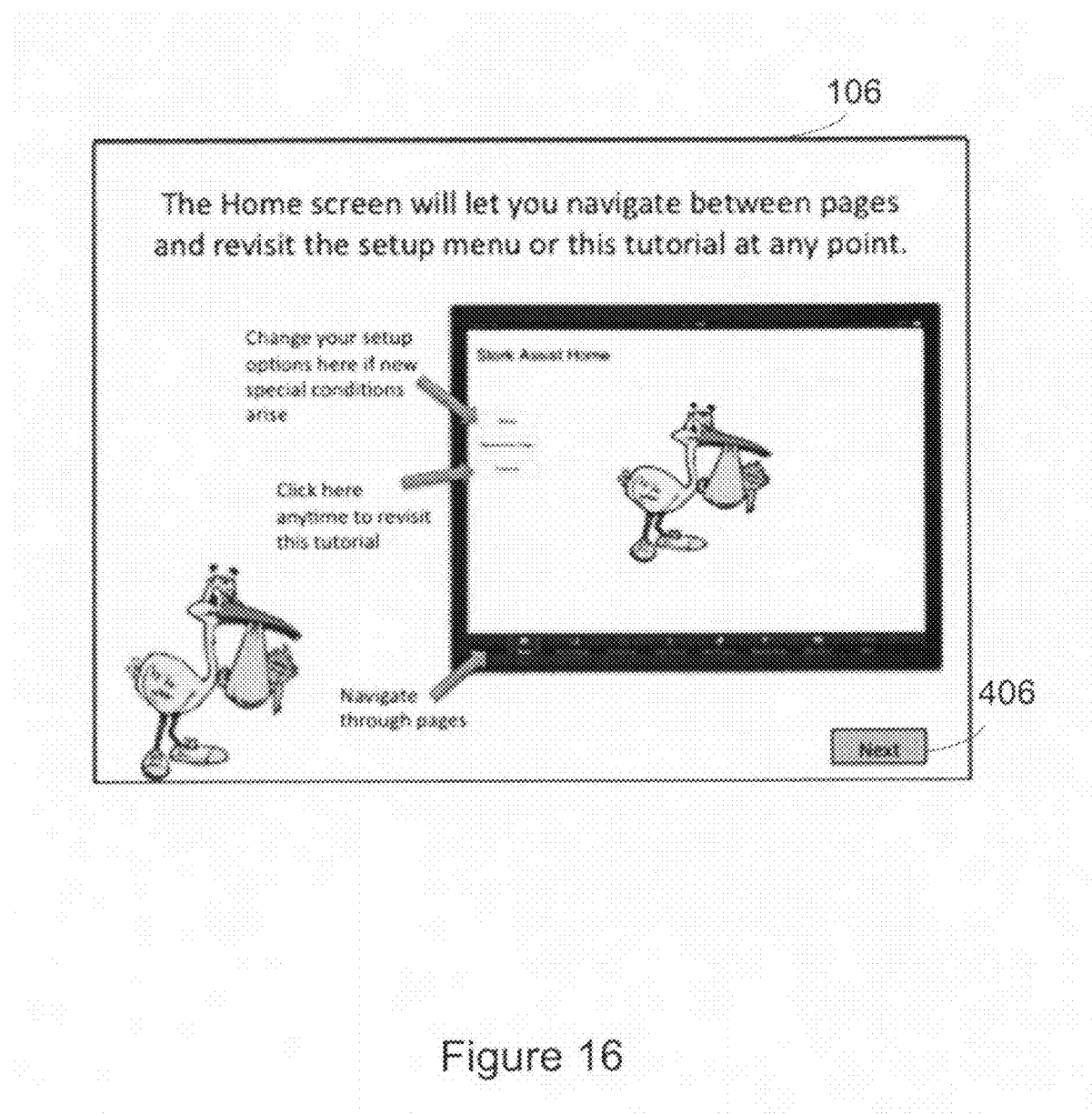
FIG. 16 is a screen capture of the third view of the Tutorial View Sequence of FIG. 5 according to an exemplary embodiment disclosed herein.
Figure 17:
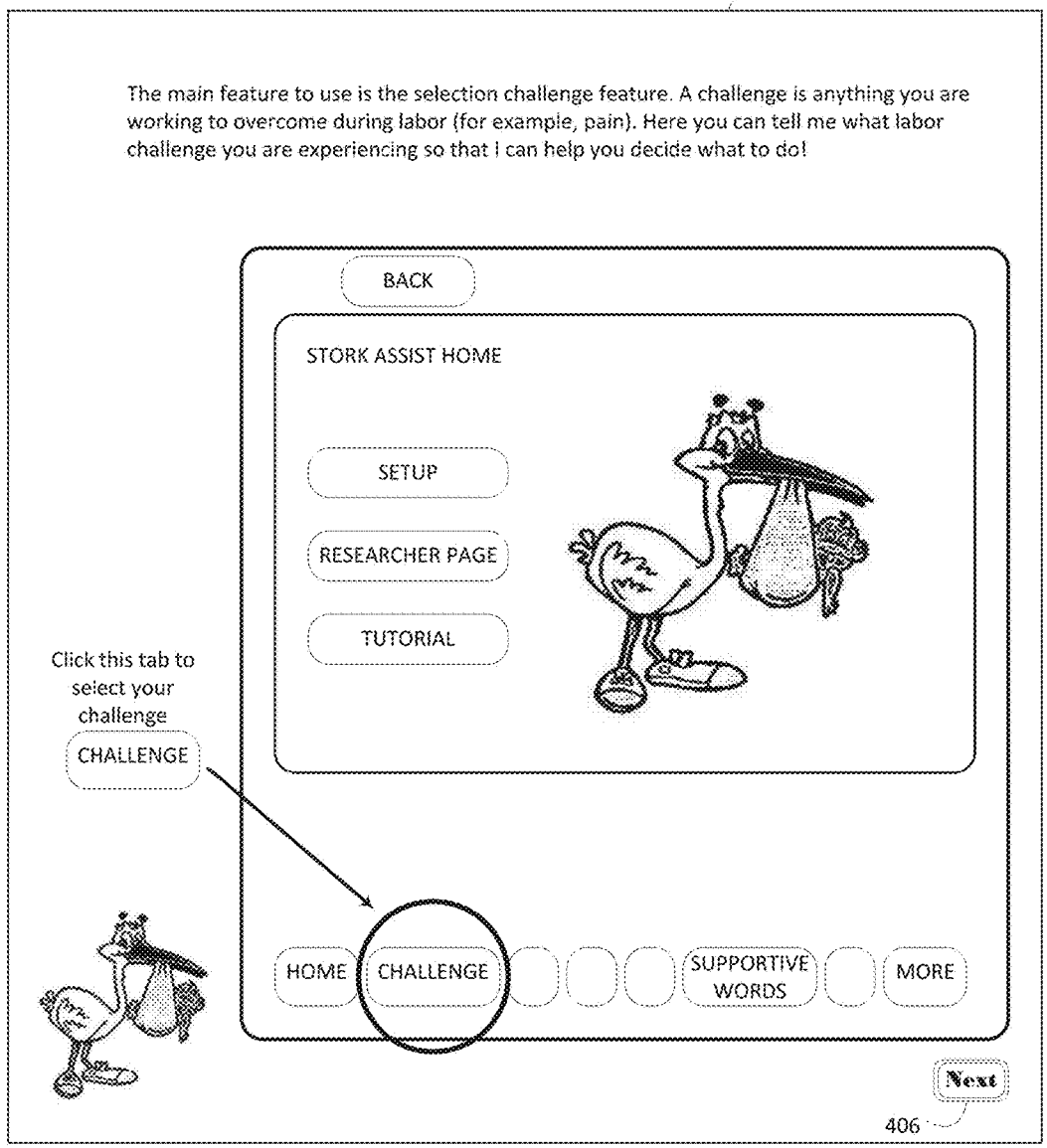
FIG. 17 is a screen capture of the fourth view of the Tutorial View Sequence of FIG. 5 according to an exemplary embodiment disclosed herein.
Figure 18:
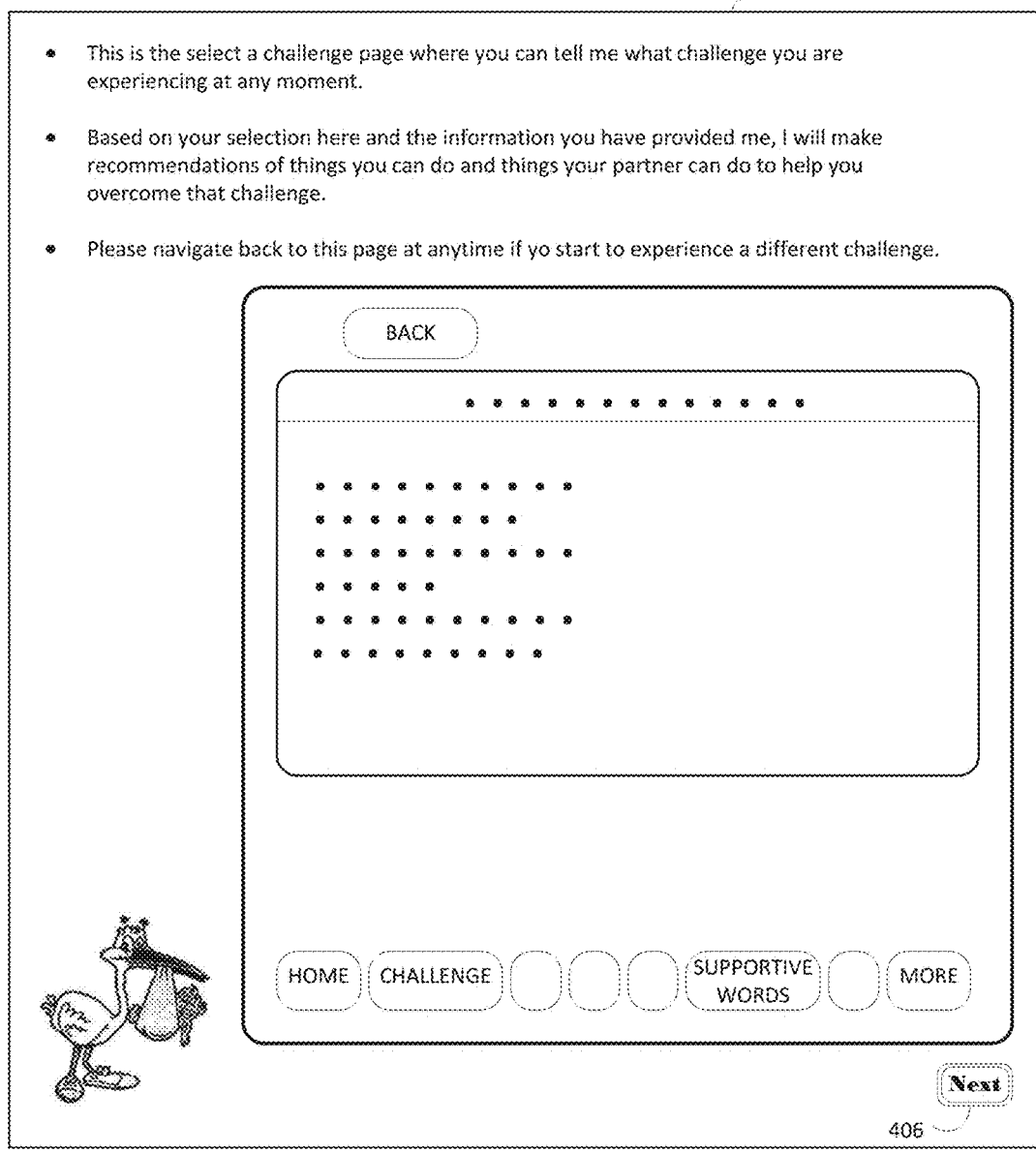
FIG. 18 is a screen capture of the fifth view of the Tutorial View Sequence of FIG. 5 according to an exemplary embodiment disclosed herein.
Figure 19:
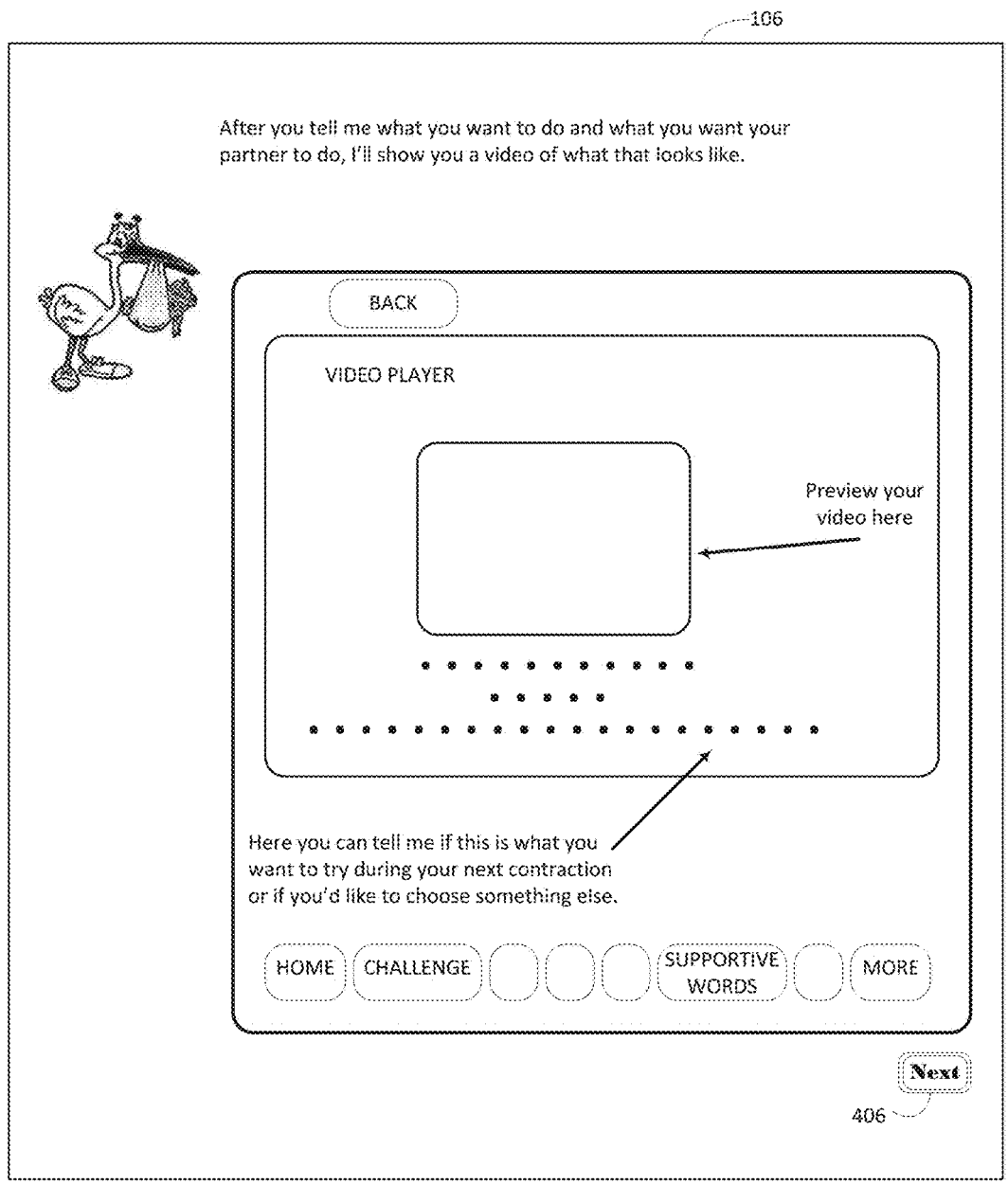
FIG. 19 is a screen capture of the sixth view of the Tutorial View Sequence of FIG. 5 according to an exemplary embodiment disclosed herein.
Figure 20:
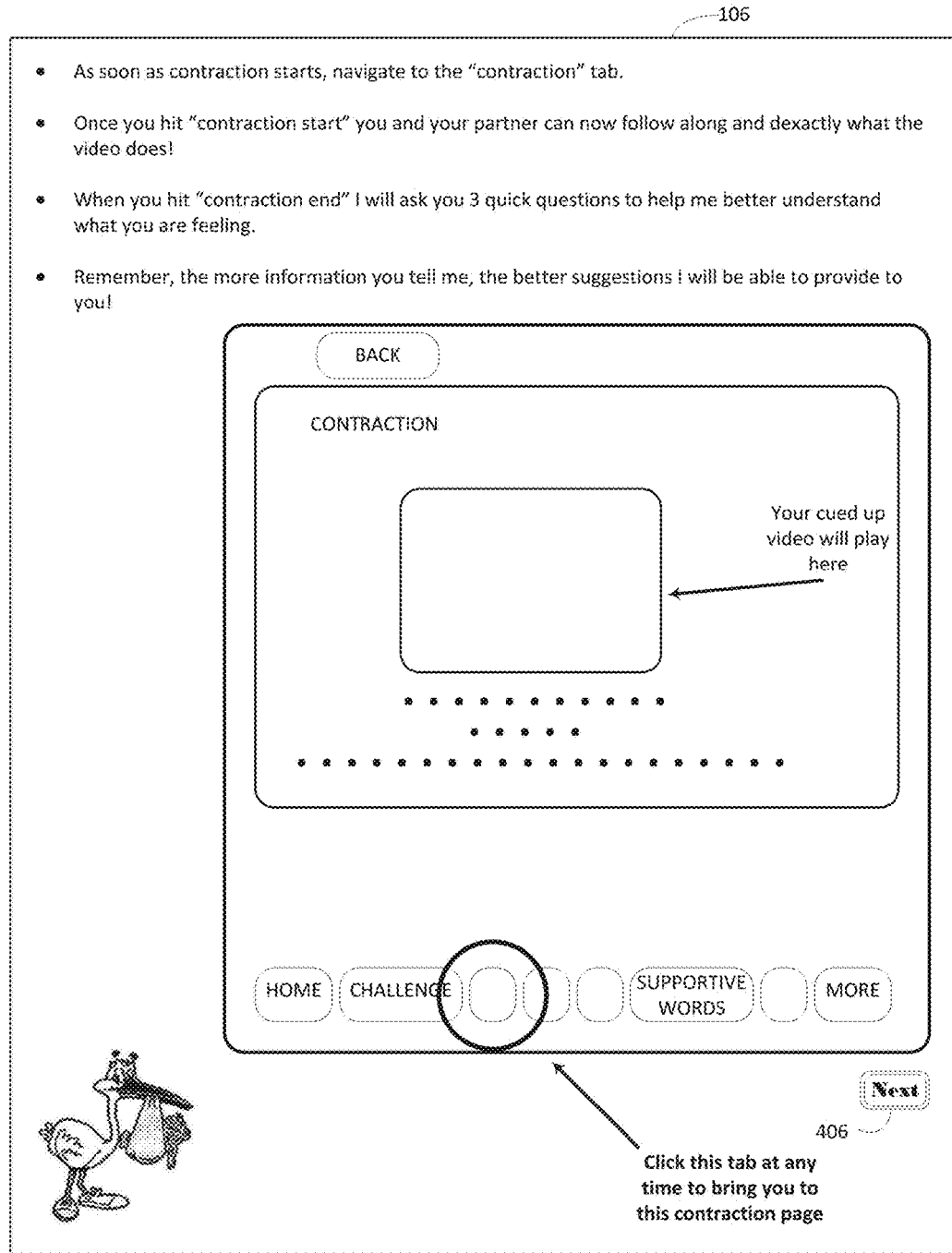
FIG. 20 is a screen capture of the seventh view of the Tutorial View Sequence of FIG. 5 according to an exemplary embodiment disclosed herein.
Figure 21:
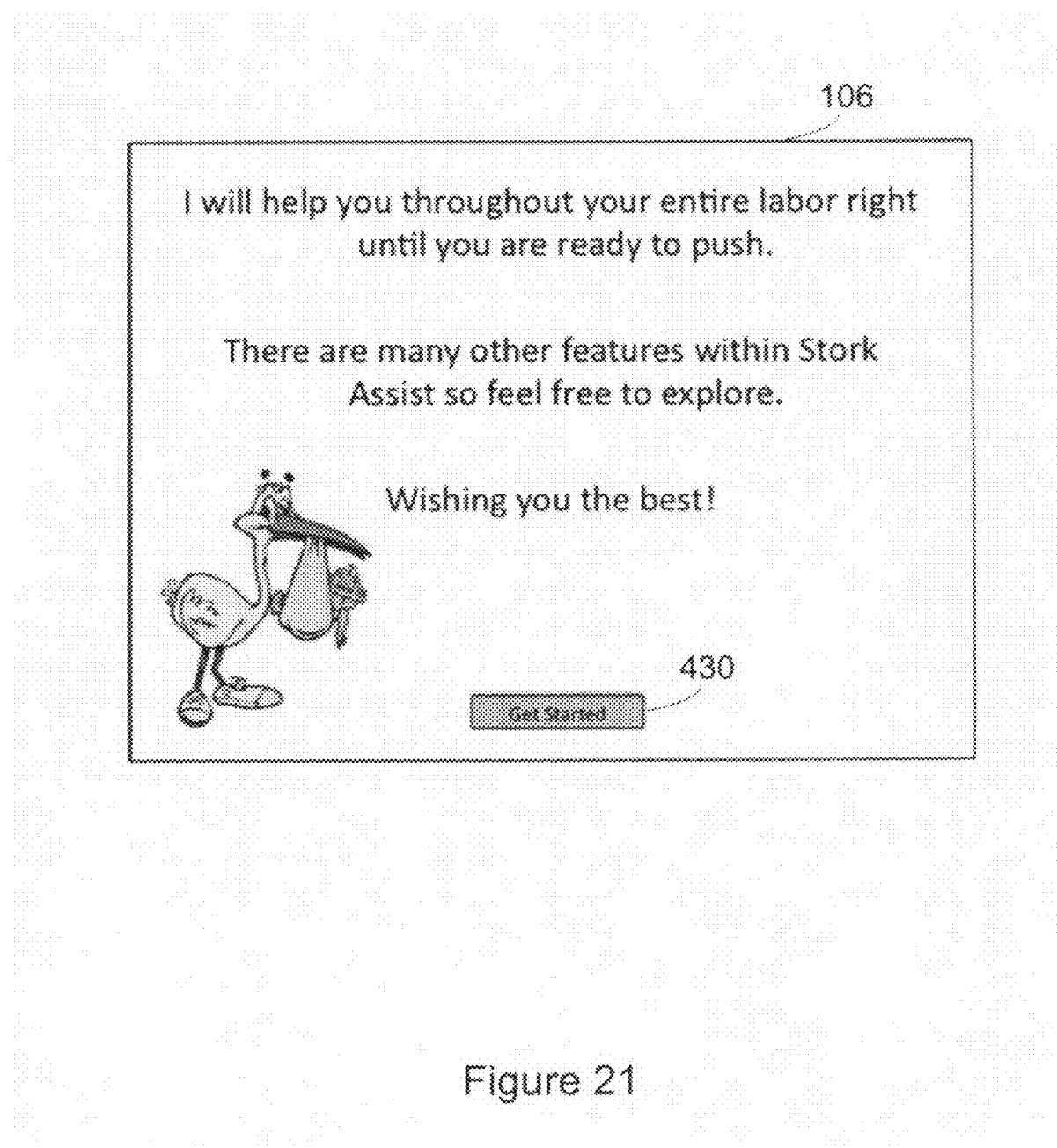
FIG. 21 is a screen capture of the eighth view of the Tutorial View Sequence of FIG. 5 according to an exemplary embodiment disclosed herein.

With reference now to FIG. 8, the behavior based birthing assistance example includes a series of non-hierarchical views that combine a selection view 80 with data collection views 82. Although non-hierarchical, in some embodiments, the logic of the view controllers may force serial, single-path traversal through the set of views. A tab on the Tab Bar Control 109 directs the tab controller to communicate with the Contraction View Controller 112, which in turn displays the Contractions View 214. If a contraction started event is detected 204 by the Contraction View Controller 112, the Contraction View Controller 112 can determine the guidance video flagged for playback 206, update the Contractions View 214 video playback container with the flagged video content or video stream, and/or initiate the playback of the video 208. If a contraction ended event is detected 210 by the Contraction View Controller 112, the Contraction View Controller will direct the question View Controller 202 to display the Post Contraction Survey View 216. When the Question View Controller 202 detects a completion event, the Question View Controller 202 will direct the Labor Progress View Controller 114 to display the labor progress view 128. The Labor Progress View 128 will capture data related to various parameters associated with ongoing labor and can store this information in a persistent data store 212.

Referring now to FIG. 9 through FIG. 13, the title view controller displays the Title View 90. In some embodiments, the Title View 90 is maintained for a fixed period of time based on a timer object instantiated by the title view controller. Upon expiration of the timer, the title view controller directs the copyright view controller to display the Copyright View 92. The Copyright View can contain, for example, copyright or other proprietary notice information. In some embodiment, the Copyright View 92 is also maintained for a fixed period of time based on a timer object instantiated by the copyright view controller. Upon expiration of the timer, the copyright view controller directs the welcome view controller to display the Welcome View 98. The Welcome View 98 can contain information explaining waiver or consent views. The Welcome View 98 in this example includes a Continue button 305 that sends a button press event to the welcome view controller. In some embodiments, detection of a button press event is necessary to proceed past one or more introductory views. When the welcome view controller detects the button press event, it directs the consent view controller to display the Consent View 94.

The Consent View 94 can contain information indicating that the user consents to certain terms when pressing the Continue button or using the application, for example. In this example, the Consent View 94 includes a Continue button 306 that sends a button press event to the consent view controller. In some embodiments, detection of a button press event is necessary to proceed. When the consent view controller detects the button press event, it directs the regulatory view controller to display the Regulatory View 96. The Regulatory View 96 can contain regulatory information relevant to treatment delivery, such as that required by the Health Insurance Portability and Accountability Act of 1996. In this example, the Regulatory View 96 includes a Continue button 310. In some embodiments, detection of a button press event is necessary to proceed. In some embodiments, the Continue button 310 sends a button press event to the regulatory view controller. In some embodiments, when the regulatory view controller detects the button press event, it directs a tutorial view controller to display the first tutorial view in the Tutorial View Sequence 106. In another embodiment, control is passed to the home view controller.

With reference now to FIG. 14 through FIG. 21, one or more tutorial view controllers can display one or more tutorial views. In the behavior based birthing assistance example, eight tutorial views in the Tutorial View Sequence 106 can be displayed each time the application is executed, upon detection of a Tutorial button press event 606 in the Home View 100, or both. The tutorial views can include content such as, for example, a description of how to use of the application, screenshots of one or more features of the application, and/or description of how to use particular features. The last view in the Tutorial View Sequence 106 can include a Get Started button 430 directing the tutorial view controller to direct the home view controller to display the Home View 100. In some embodiments, a video tutorial and/or a help function can provide general and/or feature-specific assistance.

Figure 22:
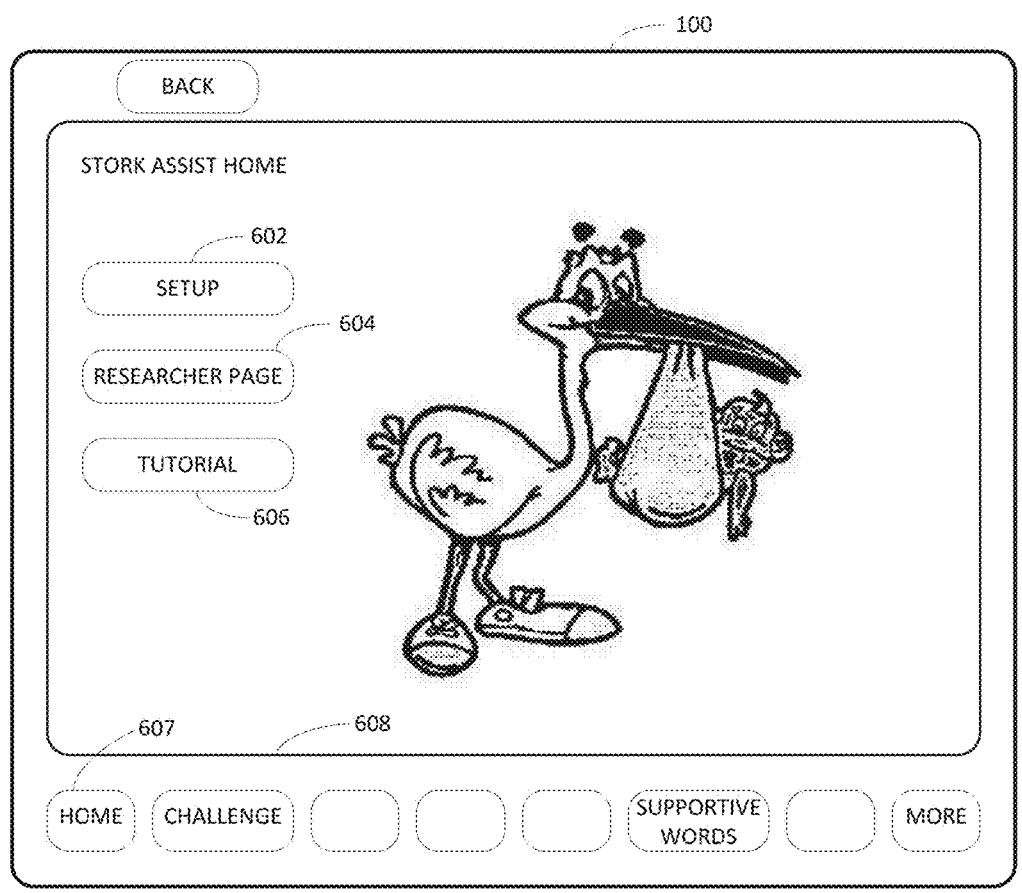
FIG. 22 is a screen capture of the Home View of FIG. 5 according to an exemplary embodiment disclosed herein.

In some embodiments, a main view can serve as a relatively centralized navigation point within the application. With reference now to FIG. 22, a Home View 100 provides access to various paths and features of the behavior based birthing assistance embodiment. This view includes three buttons that allow access to view paths and features not available on the Tab Bar Control 608, including, for example, a Setup button 602, a Research Page button 604, and a Tutorial button 606. The Home view can be accessed when the Tab Control 608 is displayed through the detection of a Home Tab 607 selection event. The tabs on the Tab Bar Control 608 can appear concurrently with every application view.

Figure 23:
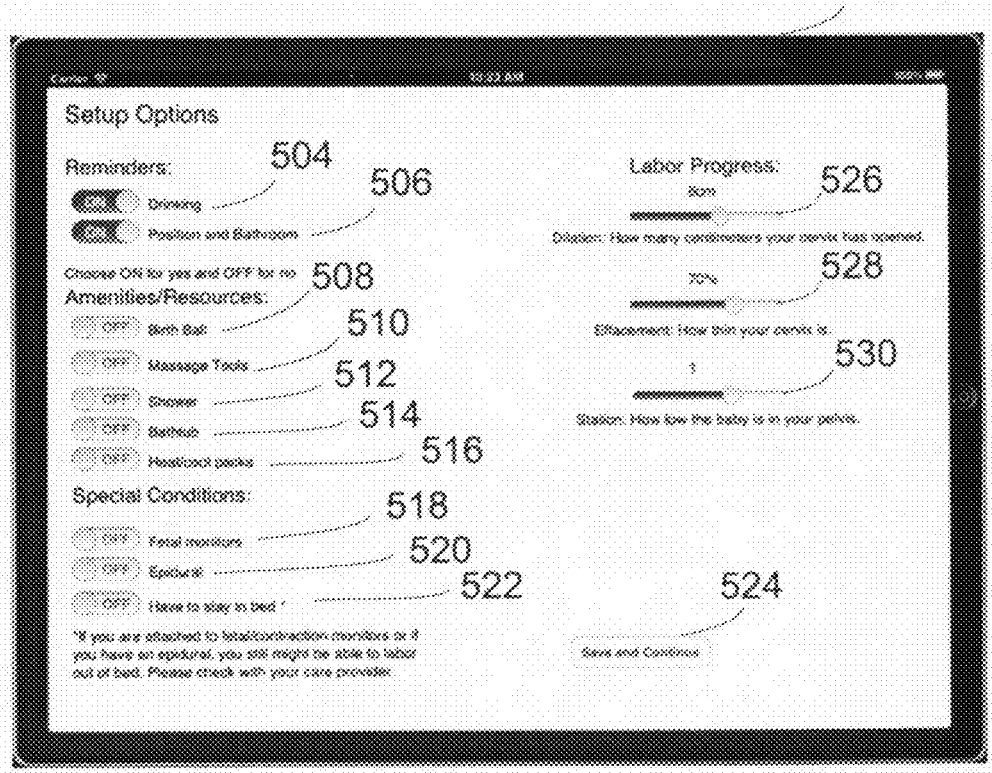
FIG. 23 is a screen capture of the Setup View of FIG. 5 according to an exemplary embodiment disclosed herein.
Figure 24:
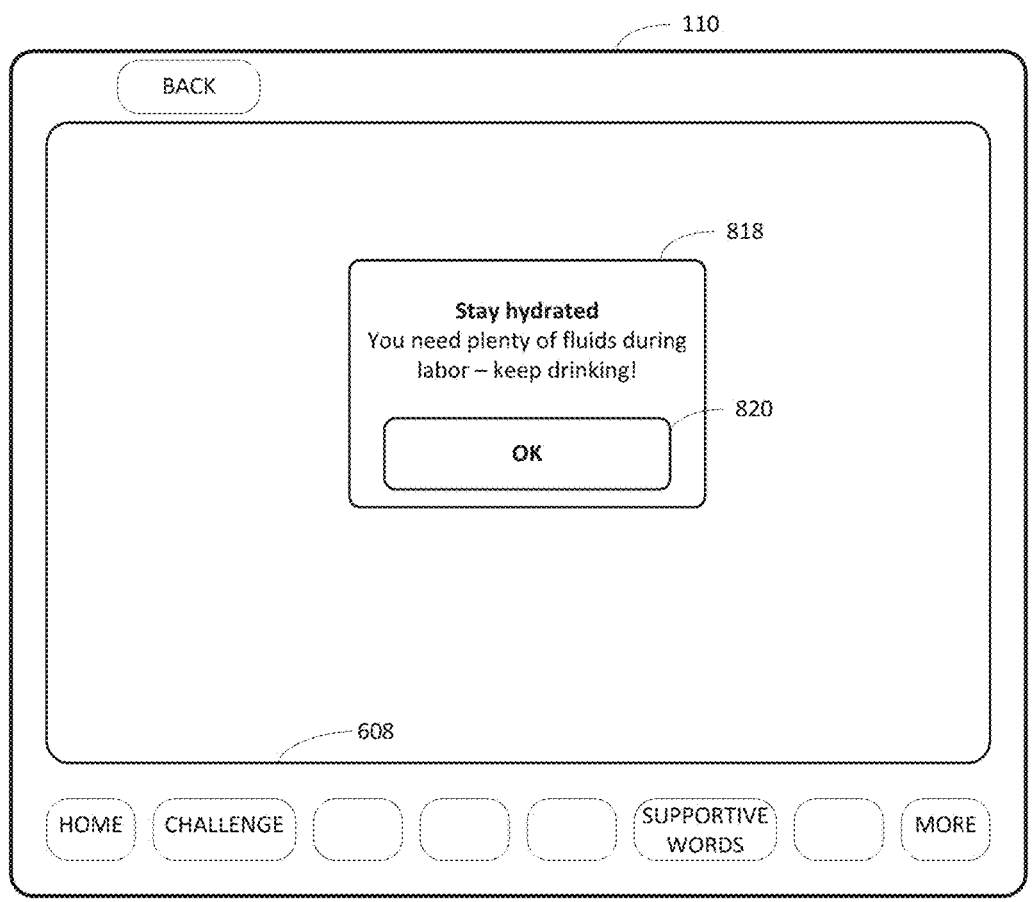
FIG. 24 is a screen capture of the drink reminder notification configured in the Composer View of FIG. 25 according to an exemplary embodiment disclosed herein.

In certain embodiments, the application can prompt for and collect information about the patient condition, patient preferences, external conditions, and/or available resources. With reference now to FIG. 23, a Setup View Controller 97 displays a Setup View 102. UI slider controls 526, 528, 530 can record medically measurable areas of labor progress such as, for example, station, dilation, and effacement. Amenities and resources available during labor, such as, for example, a birth ball, massage tools, shower, bathtub, and heat and cold packs are indicated by the position of on/off slider controls 508, 510, 512, 514, 516. Special conditions such as, for example, fetal monitors, epidural usage, or confinement that may be used by one or more features of the application are also indicated by on/off slider controls 518, 520, 522. Preferences for the activation or deactivation of timed reminders, such as, for example, hydration notifications and change position notifications are also indicated by the position of on/off slider controls 504, 506. Referring briefly to FIG. 24, a modal hydration message 818 is displayed consistent with the value set by the position of the Drinking reminder on/off slider switch 504 that can be dismissed upon detection of an OK button press event 820.

Detection by the Setup View Controller 97 of a Save and Continue button press event can initiate the storage of one or more of the various selection values of the Setup View 102 in volatile memory, a persistent data store, and/or a log file. The application behaviors and paths may be tailored by the application logic based on one or more of the selection values by, for example, filtering out certain coping strategy options that are irrelevant or lack benefit. In some embodiments, labor progress values are used to generate labor diagrams, filter different suggestions, and strategies based on the stage of labor, or both.

Figure 25:
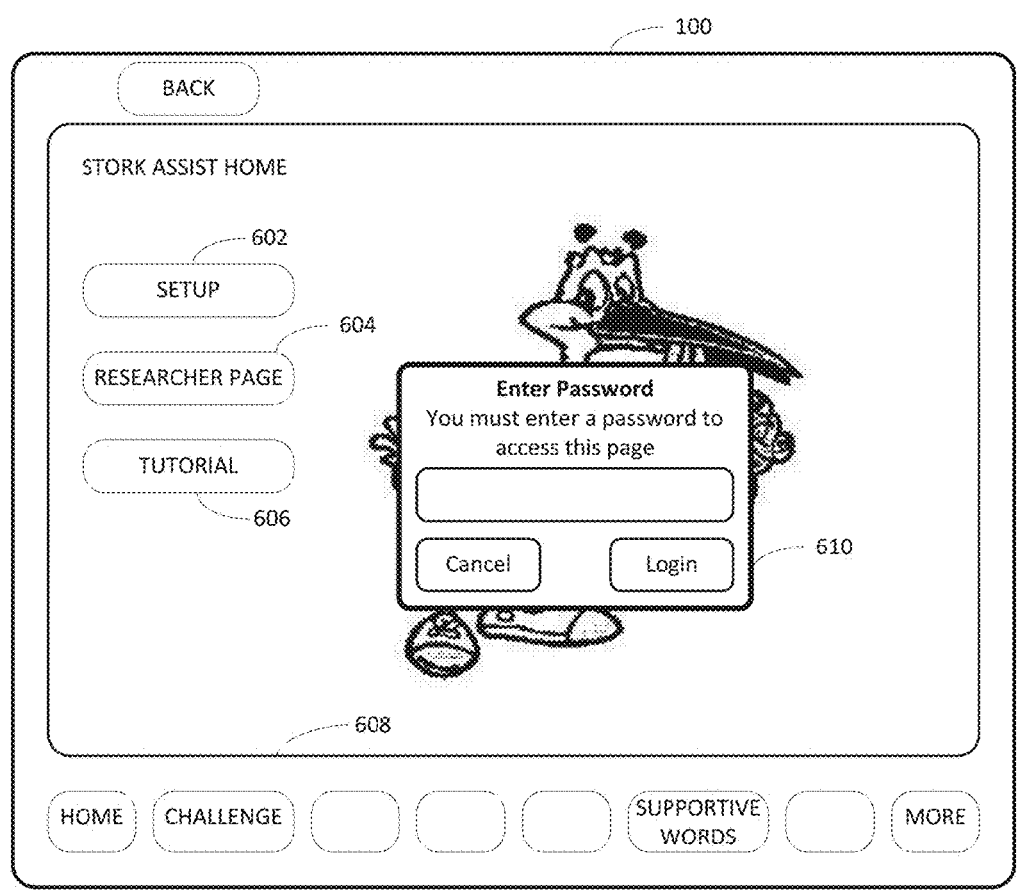
FIG. 25 is a screen capture of the authentication prompt for the Composer View of FIG. 5 according to an exemplary embodiment disclosed herein.
Figure 26:
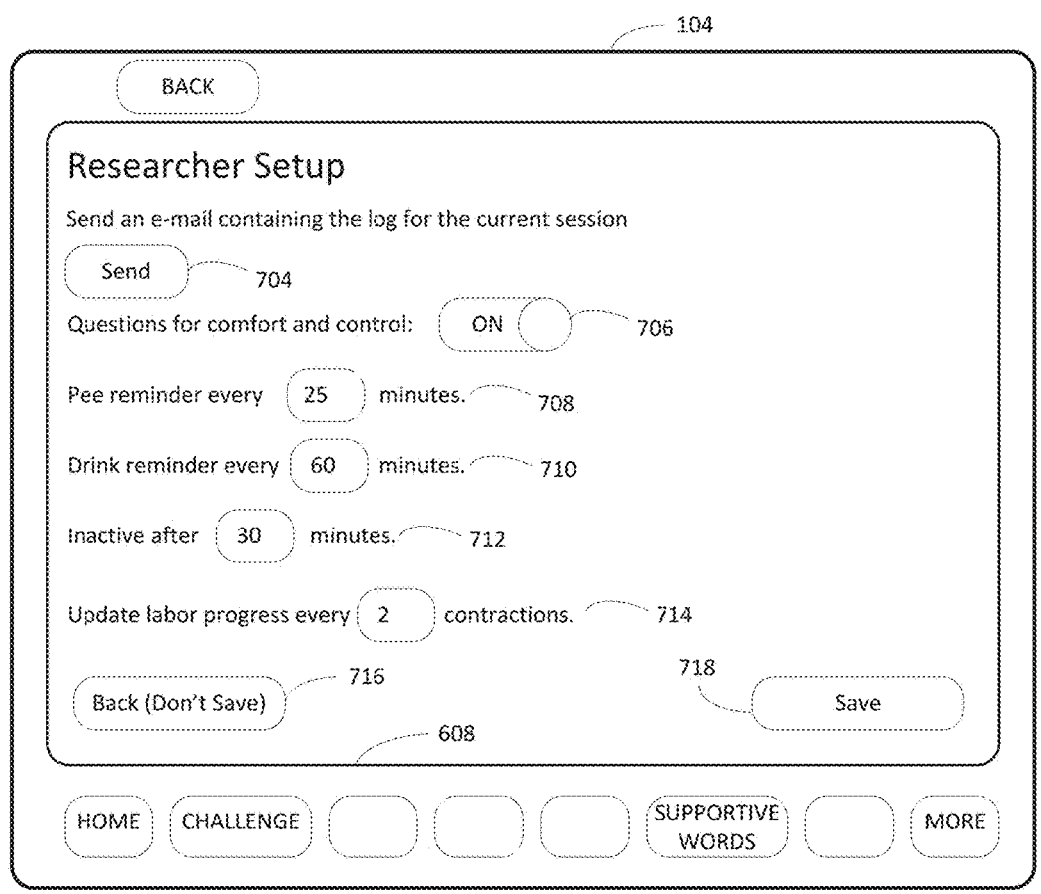
FIG. 26 is a screen capture of the Composer View of FIG. 5 according to an exemplary embodiment disclosed herein.

Referring now to FIG. 25, in some embodiments, when the home view controller detects a Researcher Page button press event 604, a modal authentication dialog 610 is displayed requiring submission of valid authentication credentials such as, for example, a password. The home view controller determines if the submitted password is valid and conditionally communicates with the Composer View Controller 99. With reference now to FIG. 26, the Composer View Controller 99 displays the Composer View 104 providing access to controls for setting additional configuration parameters. These controls include, for example, an (i) an edit box setting the time intervals for reminder pop-ups 708, 710; (ii) an edit box setting the contraction intervals in which the user is asked to update their labor progress 714; (iii) an on/off slider switch controlling whether questions are displayed following each contraction 706; and/or iv) an edit box setting a timer for placing the application in an inactive state 712. Parameter values are saved when a Save button press event 718 is detected, or abandoned if a Back (Don't Save) button press event is detected 716.

Figure 27:
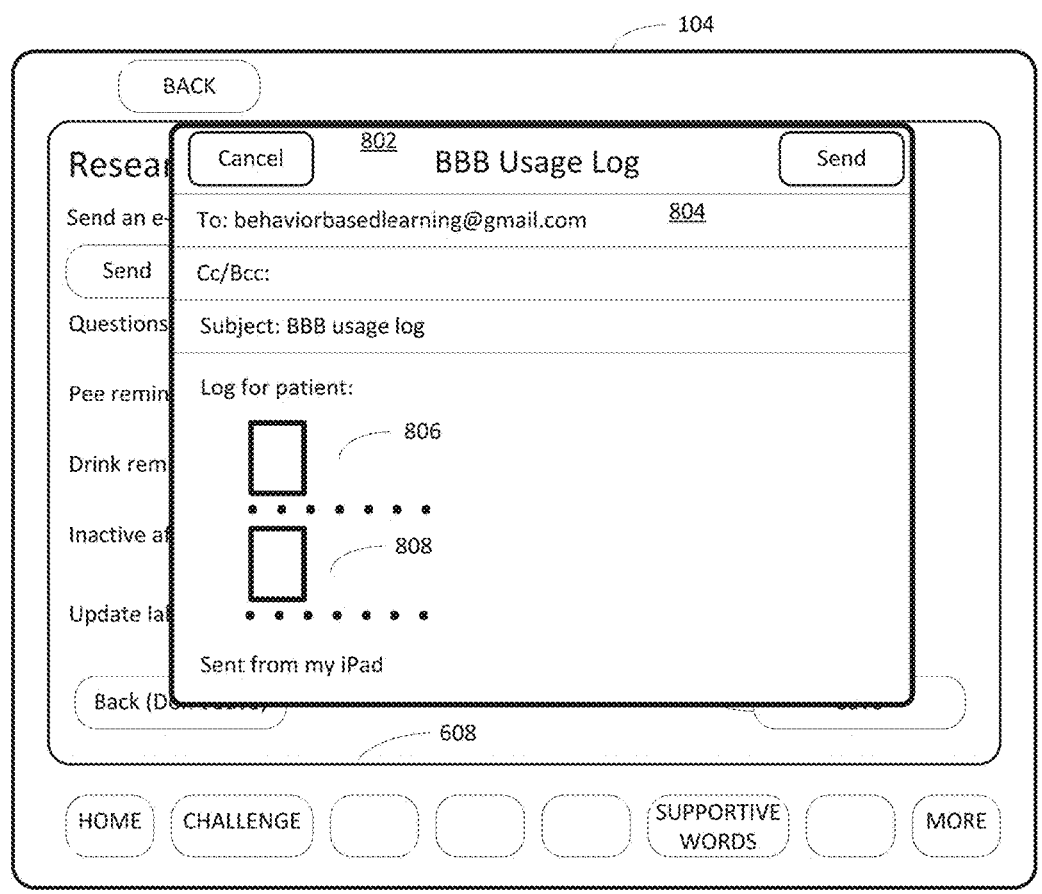
FIG. 27 is a screen capture of the send mail event initiated from the Composer View of FIG. 5 according to an exemplary embodiment disclosed herein.

In some embodiments, application data can be exported and/or communicated to other computing devices. In this example, the Composer View 104 includes a Send button 704. The detection of a Send button press event 704 can generate a message containing information relating to the execution of the application on the device. In some instances, an email can be generated that includes, for example, a session log containing information on data obtained during one or more sessions and/or a navigation log detailing the navigations paths executed over a period of time. With reference now to FIG. 27, an editable email form 802 can be displayed that includes a pre-populated email address 804 and one or more data files 806, 808. In other embodiments, the email is sent automatically without displaying a form.

Figure 29:
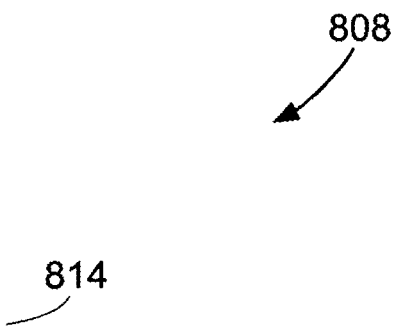
FIG. 29 is the setup and initial labor progress data portion of the session log included in the email of FIG. 26 according to an exemplary embodiment disclosed herein.

With reference to FIG. 28, the comma-separated values file 806 can contain structured data 810 obtained during one or more application sessions. This data can include, for example, data relating to contraction events such as time of contractions, the video played during each contraction, the perceived level of pain, the perceived level of control, and/or the perceived level of partner support 812. With reference now to FIG. 29 and FIG. 30, a data file 808 can contain ordered data that logs configuration parameter values 814, navigation paths 816, and/or data obtained during one or more sessions 817.

Figure 31:
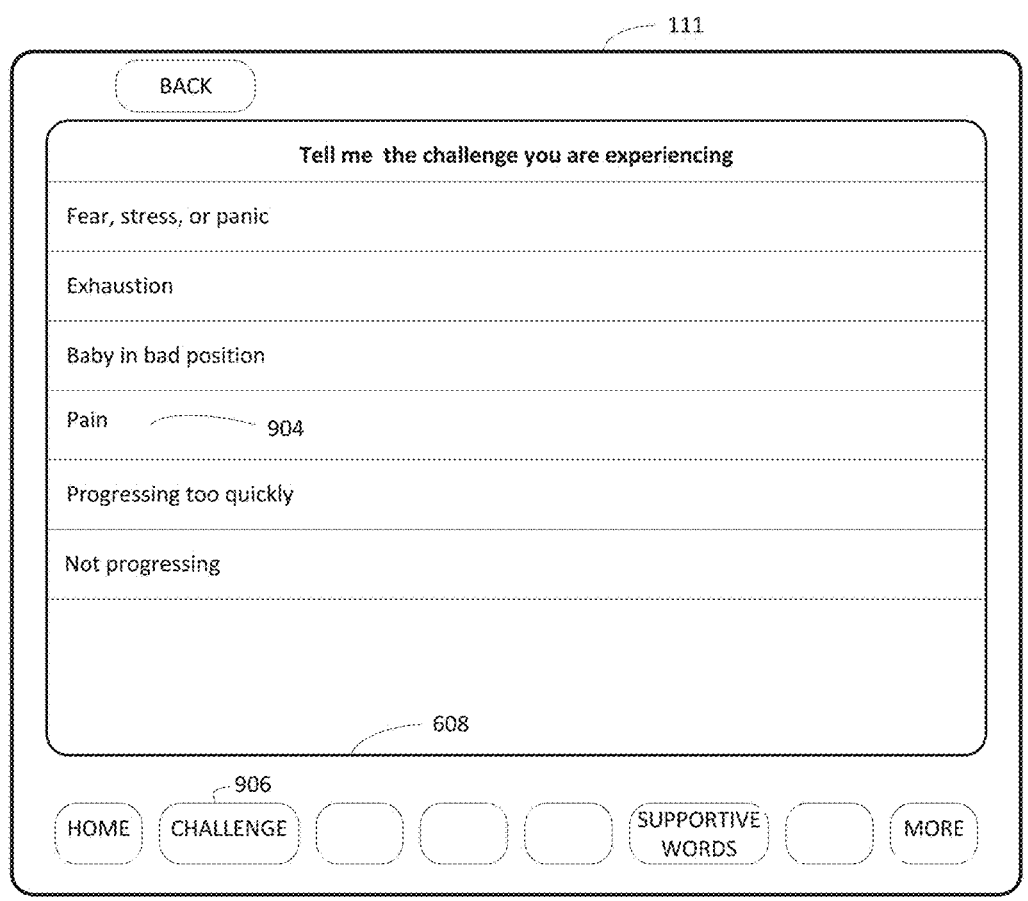
FIG. 31 is a screen capture of the Challenge Selection View of FIG. 7 according to an exemplary embodiment disclosed herein.

With reference now to FIG. 31, the Challenge Selection View Controller 110 (not shown in FIG. 31) displays the Challenge Selection View 111 in response to a Select Challenge tab press event 906 on the Tab Control Bar 608. The Challenge Selection View 111 displays common labor challenges that a patient may experience such as, for example, fear/stress/panic, exhaustion, the baby being in a undesired position, pain, labor progressing too quickly, and/or labor not progressing. One or more selection items, such as the Pain selection item 904, can be associated with additional views.

In some embodiments, selection items appearing in various levels of hierarchical dependent views can be retrieved dynamically from a property list file. Referring now to FIG. 32 and FIG. 33, a property list editor displays the contents of the property list file used to populate the Challenge Selection View 111, the Pain Selection View 150, the Position Selection View 152, the Guidance Selection View 154, and the Partner Option Selection View 156. The hierarchical dependency of the selections as represented in the property list file and/or filtering logic relating to the values of configuration parameters can determine the set of selections displayed in the various views.

For example, in the behavior based birthing assistance embodiment, a patient or patient's assistant may select the Pain selection item 904 in the Challenge Selection View 111. This selection is passed to the Pain Table View Controller 164 by the Challenge Selection View Controller 110. The Pain Selection View Controller 164 displays the Pain Selection View 150.

Figure 34:
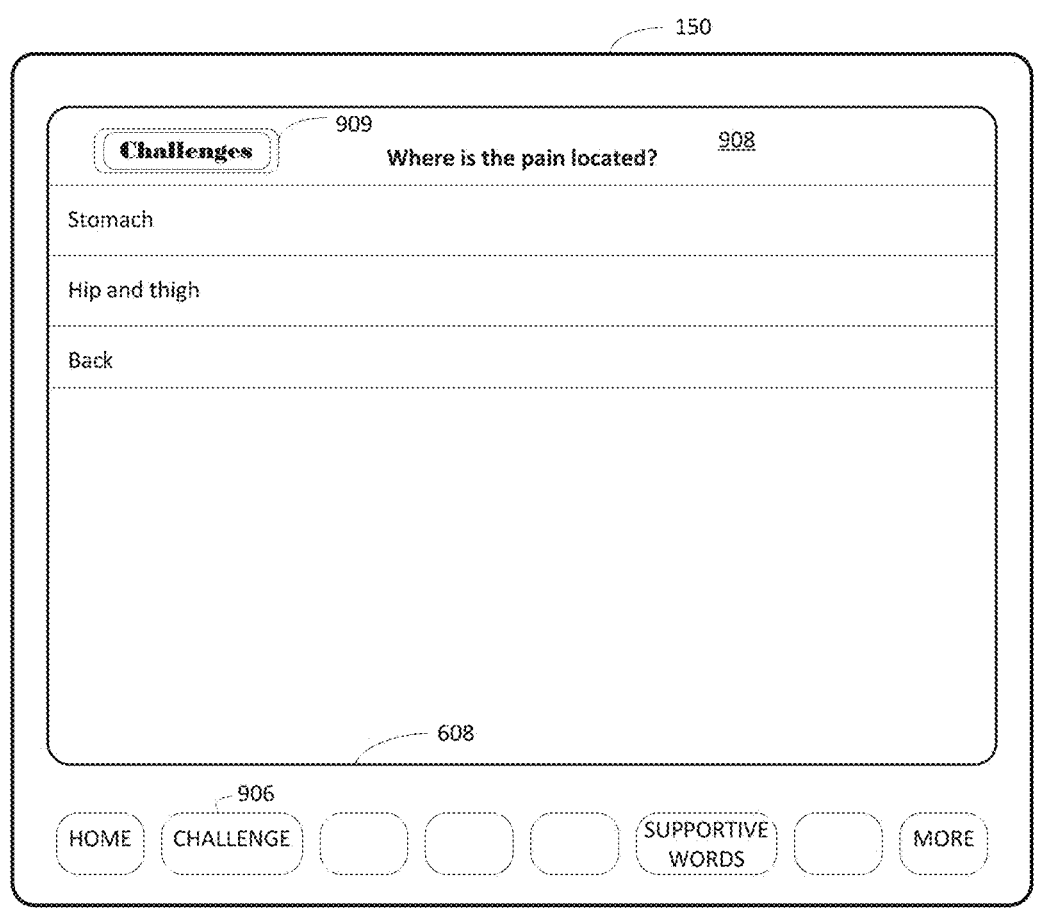
FIG. 34 is a screen capture of the Pain Selection View of FIG. 7 according to an exemplary embodiment disclosed herein.

With reference now to FIG. 34, the Pain Selection View 150 can be displayed in conjunction with a Navigation Bar 908 that includes a Navigation Button 909. The Tab Bar Control 608 can be displayed as well with the Select Challenge tab item 906 highlighted, indicating that the present view is within the hierarchy of views associated with the Challenge Selection View 111. The Pain Table View Controller 164 detects a selection event and passes the selection to the Position For Me View Controller 168. The Position For Me View Controller 168 then uses the selection to determine the appropriate set of selection items from the property list file to display in the Position Selection View 152. The patient or patient's assistant may then select a general position they feel may be the most comfortable or convenient for them at that time, such as, for example, sitting, standing, laying, kneeling, or squatting.

Figure 35:
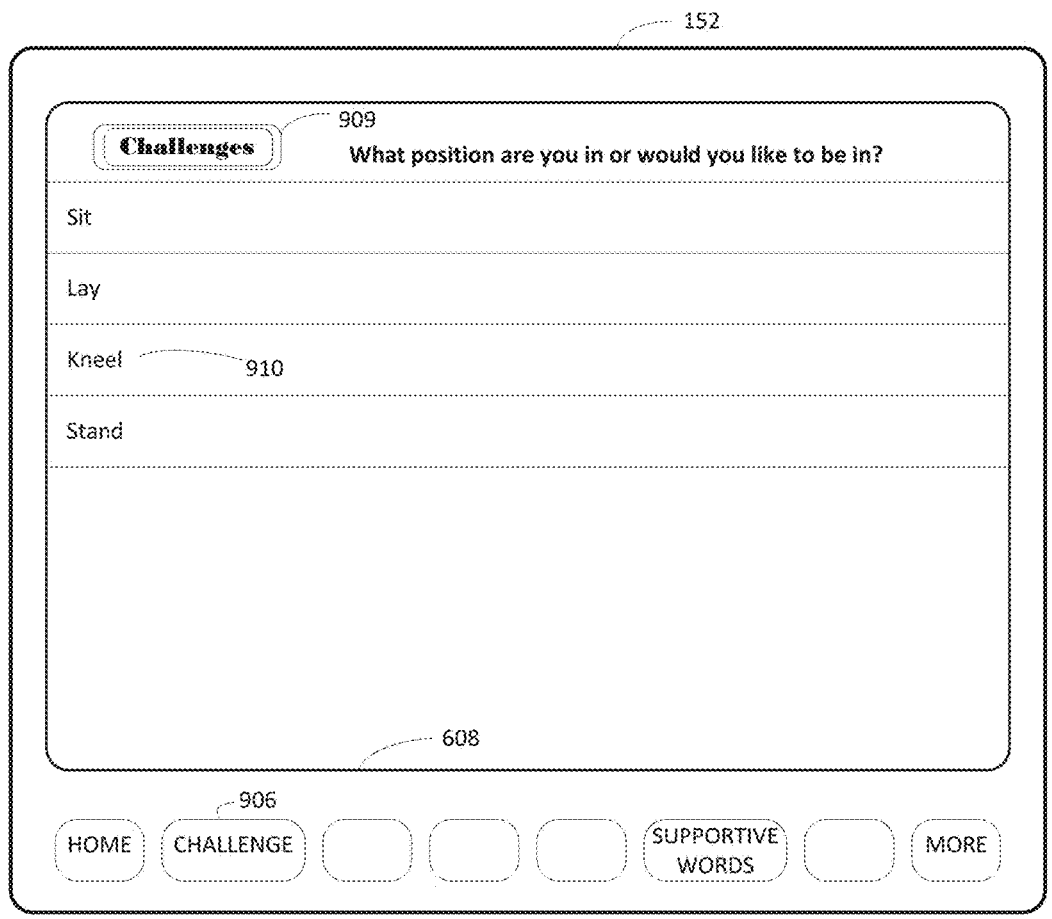
FIG. 35 is a screen capture of the Position Selection View of FIG. 7 according to an exemplary embodiment disclosed herein.
Figure 36:
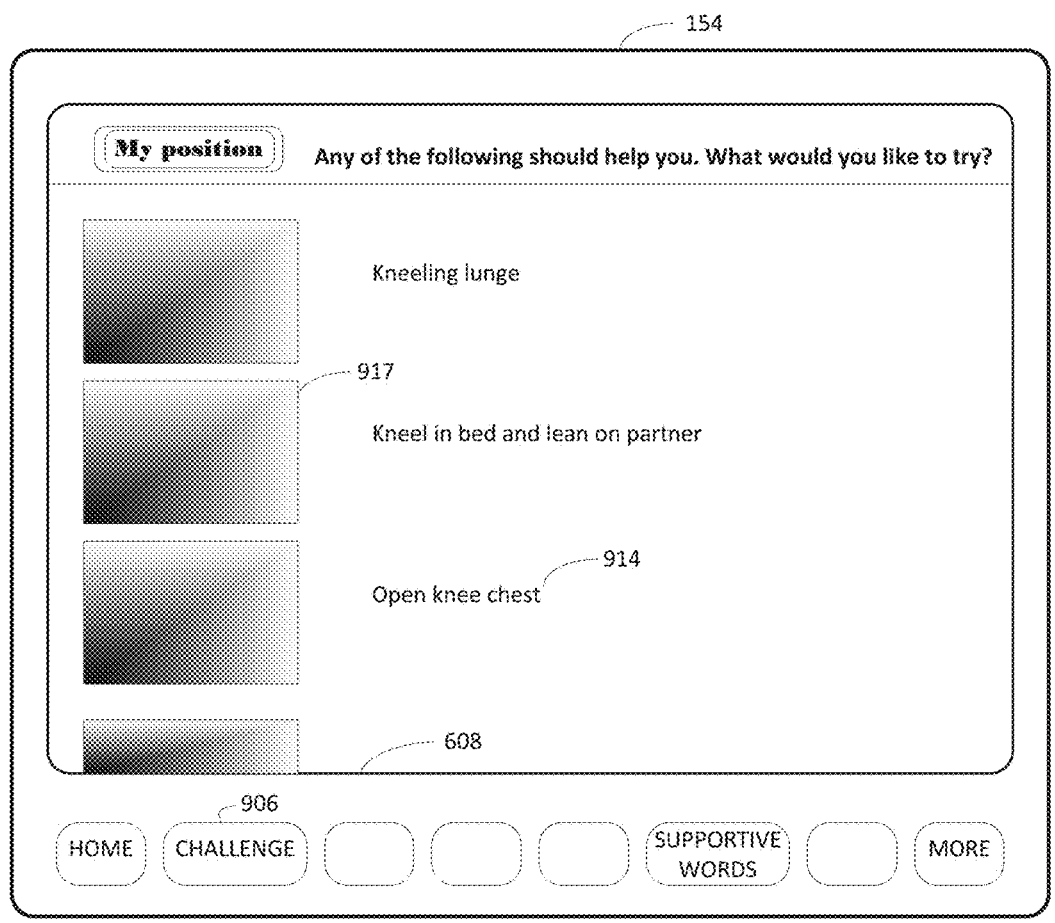
FIG. 36 is a screen capture of the Guidance Selection View of FIG. 7 according to an exemplary embodiment disclosed herein.
Figure 37:
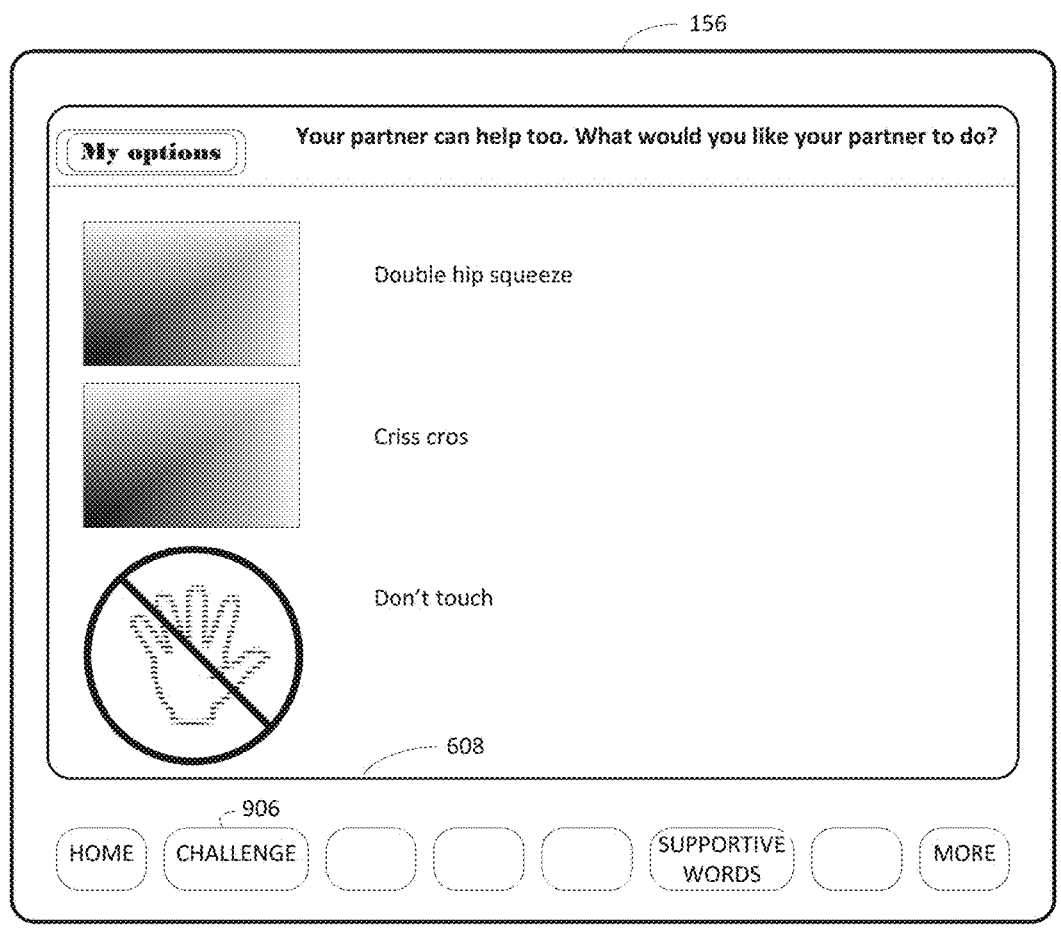
FIG. 37 is a screen capture of the Partner Option Selection View of FIG. 7 according to an exemplary embodiment disclosed herein.
Figure 38:
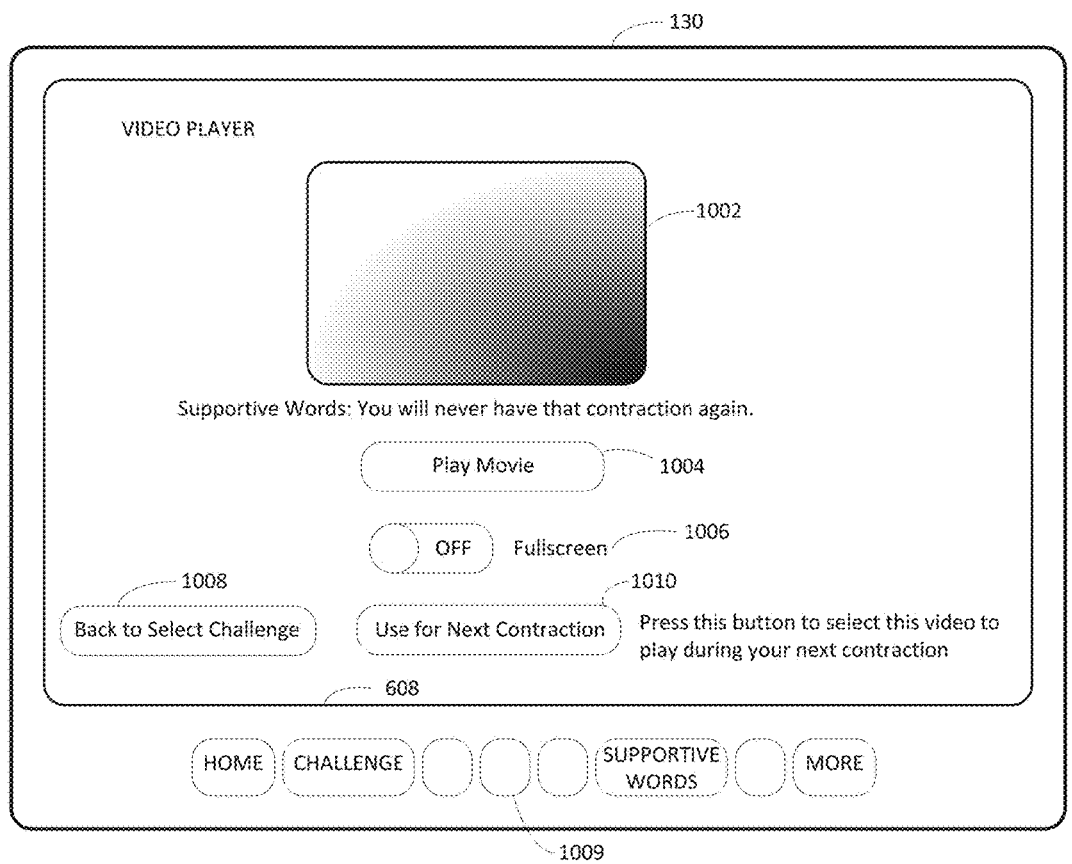
FIG. 38 is a screen capture of the Play Video View according to an exemplary embodiment disclosed herein.

With reference now to FIG. 35 and FIG. 36, one of the selection items in the Position Selection View 152 is the Kneel selection item 910. When the Position For Me View Controller 168 detects the Kneel selection event, it passes that selection to the Actions For Me View Controller 170. Based on the Kneel selection item, previous selections in the view hierarchy, and/or configuration parameters, the Actions For Me View Controller 170 will determine a set of specific labor options for display in the Guidance Selection View 154. In some embodiments, this Guidance Selection View 154 will include images 917 that may act as thumbnails for associated guidance videos. The Actions For Me View Controller 170 will detect the occurrence of a selection event in the Guidance Selection View 154 and pass the selection to the Partner Actions View Controller 172. With reference now to FIG. 37, the Partner Actions View Controller 172 determines a set of available guidance selections based on previous selections in the view hierarchy and/or configuration parameters. If more than one partner option exists, the Partner Option Selection View 156 is displayed with the set of selection items. If no partner option exists in the selection set, or if only one partner option exists, the Partner Option Selection View 156 is not displayed Referring now to FIG. 38, in some embodiments, the Partner Actions View Controller 172 or the Actions For Me View Controller 170 detects a selection event and passes the selection value to the Play Video View Controller 116. The Play Video View Controller 116 determines the associated multimedia content and loads the multimedia playback container in the Video Playback View 130 with, for example, video content. In this example from the behavior based birthing assistance embodiment, the patient or patient's assistant made the following selections in the hierarchical views: (a) laying down position; (b) side-lying lunge; and (c) for her partner to use supportive words. The selected video 1002 is loaded into the multimedia playback container, and video playback is initiated when the Play Movie button event is detected 1004 by the Play Video View Controller 116. In some embodiments, a Full Screen on/off control toggle switch 1006 sets a value used by the Play Video View Controller 116 to determine the playback mode. A Use For Next Contraction button 1010 may be displayed flagging the current video for playback upon the next load of the Contractions View 214. A Back to Select Challenge button 1008 may be displayed that allows for jump navigation back to the Challenge SelectionView 111 where the challenge selection process of FIG. 7 can reinitiate. The currently flagged video can be previewed anytime the Video Preview tab 1009 is displayed on the Tab Bar Control 608.

Figure 39:
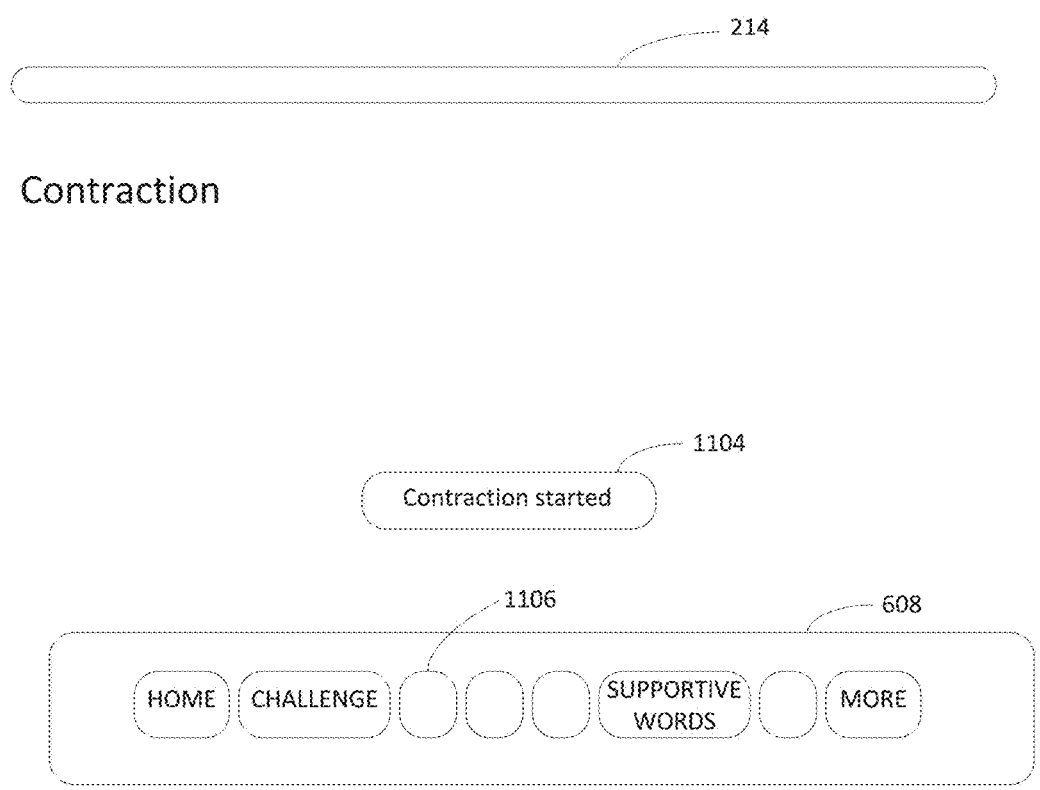
FIG. 39 is a screen capture of the Contraction View of FIG. 8 according to an exemplary embodiment disclosed herein.

The behavior based birthing assistance embodiment can guide the patient or patient assistant through a labor contraction, and capture data related to the particular labor event. With reference to FIG. 39, the Contraction View 214 is displayed when a Contractions tab event 1106 on the Tab Bar control 608 is detected by the Tab Bar Controller 109. With the onset of a contraction, a patient or patient's assistant can press the Contractions Started button 1104.

Figure 40:
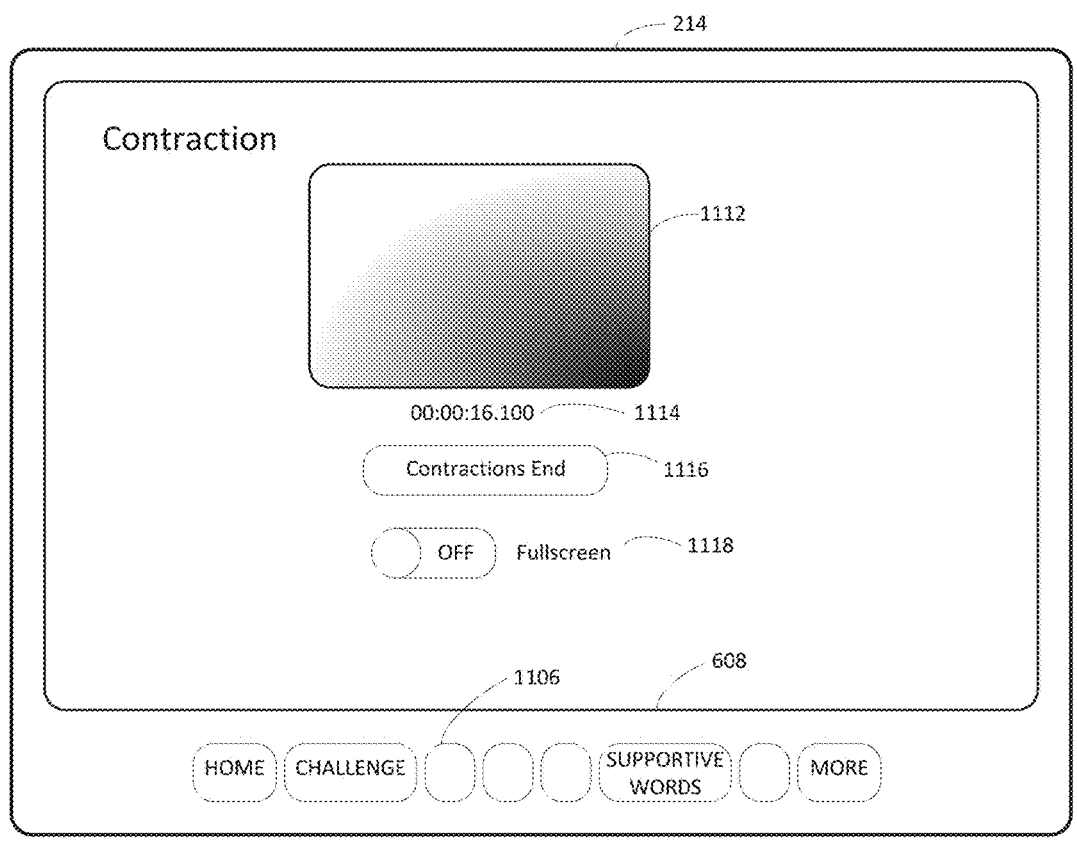
FIG. 40 is a screen capture of the Contraction View of FIG. 8 after being updated by the Contraction View Controller in response to a Contractions Started button event according to an exemplary embodiment disclosed herein.

Referring now to FIG. 40, when the Contraction View Controller 110 detects a Contractions Started button event 1104, the Contraction View 214 is updated with the video selection queued for playback 1112. If no video has been queued for playback, a default video plays such as, for example, a deep breathing video. The video will play showing the patient and/or the patient's assistant how to overcome the selected challenge. A timer can be displayed that dynamically displays elapsed time since the Contractions Started button event 1104. In some embodiments, a Full Screen on/off control toggle switch 1118 sets a value used by the Contraction View Controller 110 to determine the playback mode. When the contraction has concluded, the patient or patient's assistant can press the Contraction End button 1116.

Figure 41:
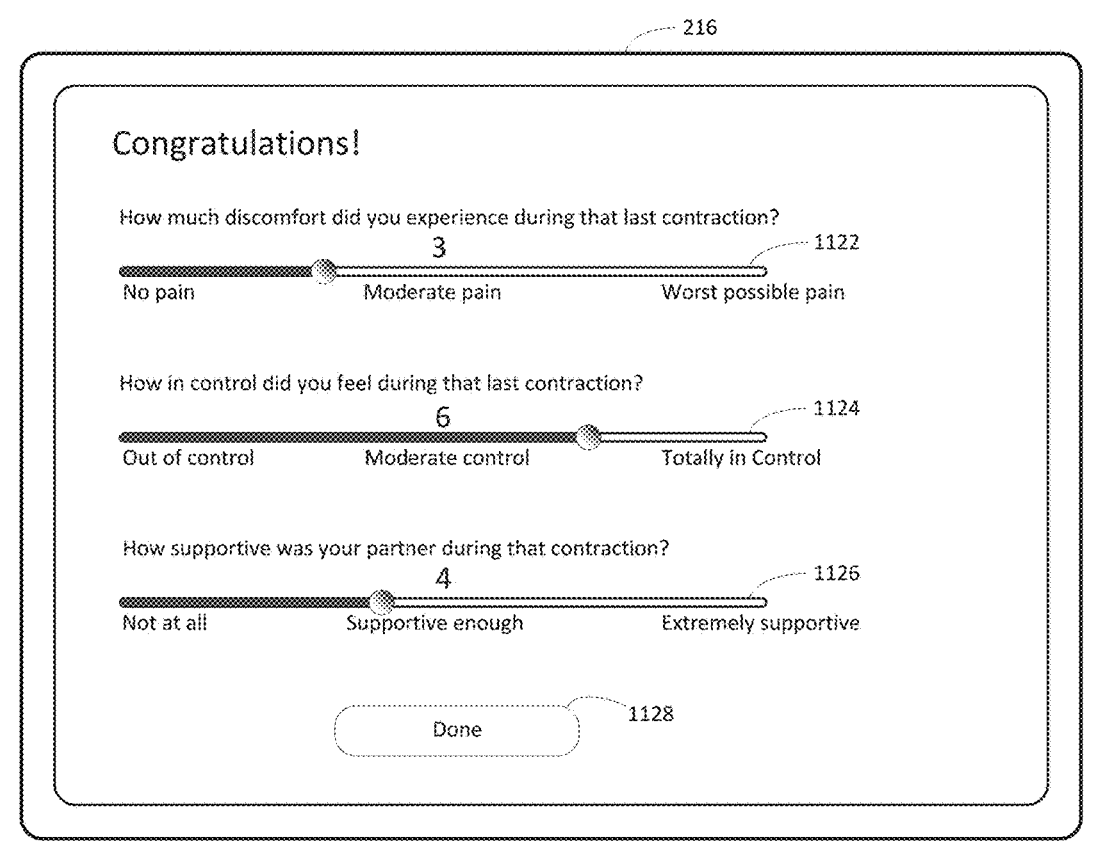

Upon detection of the Contraction End button event 1116 by the Contraction View Controller 110, the Contraction View Controller 110 directs the Question View Controller 202 to display the Post Contraction Survey View 216. With reference now to FIG. 41, in some embodiments, one or more questions may be displayed along with the appropriate controls for obtaining a response based on the Questions for Comfort and Control configuration parameter 706. In certain instances, the questions and associated response controls relate to the patient's comfort 1122, control 1124, and partner support 1126. Control can be returned to the Home View 100 upon detection of a Done button press event 1128. In some embodiments, the values set by these controls may be incorporated into the application code logic for determining selection items and challenge strategies.

Figure 42:
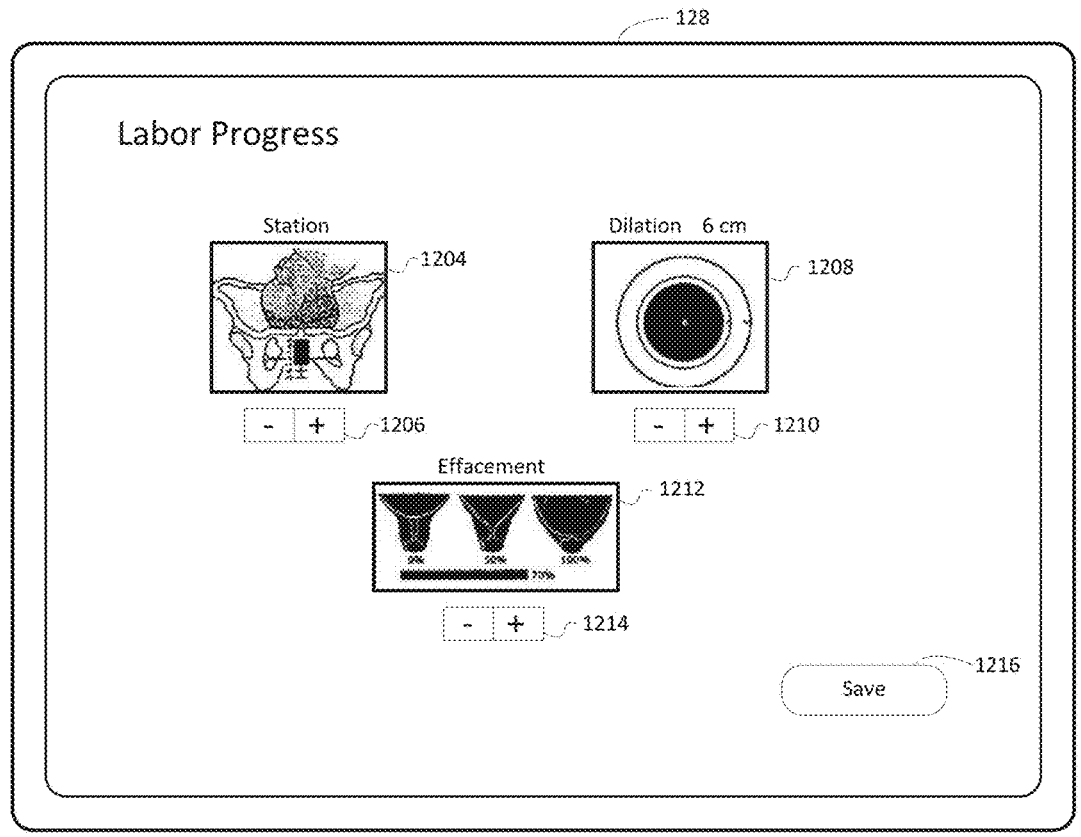
FIG. 42 is a screen capture of the Labor Progress View of FIG. 8 according to an exemplary embodiment disclosed herein.

The behavior based birthing assistance embodiment can capture data related to progress towards and throughout labor by the patient or patient's assistant. Referring now to FIG. 42, the Labor Progress View 128 is displayed when a Labor Progress tab event on the Tab Bar control 608 is detected by the Tab Bar Controller 109. In some embodiments, the Labor Progress View 128 can visually depict progress toward labor in one or more medical domains such as, for example, dilation, effacement, and/or station. Dynamic anatomically-correct graphical visualizations 1204, 1208, 1212 and associated stepper controls 1206, 1210, 1214 can be used such as, for example, a growing red bar or circle highlighting the progress in each of the medical domains. When a Save button event 1216 is detected, the Labor Progress View Controller can store the labor progress data values in volatile memory, in a persistent data store, and or in a log file. When an entire line or circle has turned red, it can serve as an indication that it is time to deliver the baby. The Labor Progress View 128 is accessible anytime the Labor Progress tab is visible on the Tab Bar control 608. The patient or patient's assistant may receive notifications to update labor progress after a predetermined number of contractions according to the Update Labor Pregnancy configuration parameter 714 set in the Composer View 104. In some embodiments, the labor progress data values can be updated remotely.

In some embodiments, one or more instructional page views can display static instructional content. Referring now to FIG. 43, a Supporting Words View 132 is displayed when the Supportive Words tab event 1304 on the Tab Bar control 608 is detected by the Tab Bar Controller 109. The Supporting Words View 132 can suggest statements a patient's partner may say that, for example, help motivate and support the laboring woman, along with explanations of when to use them.

Figure 44:
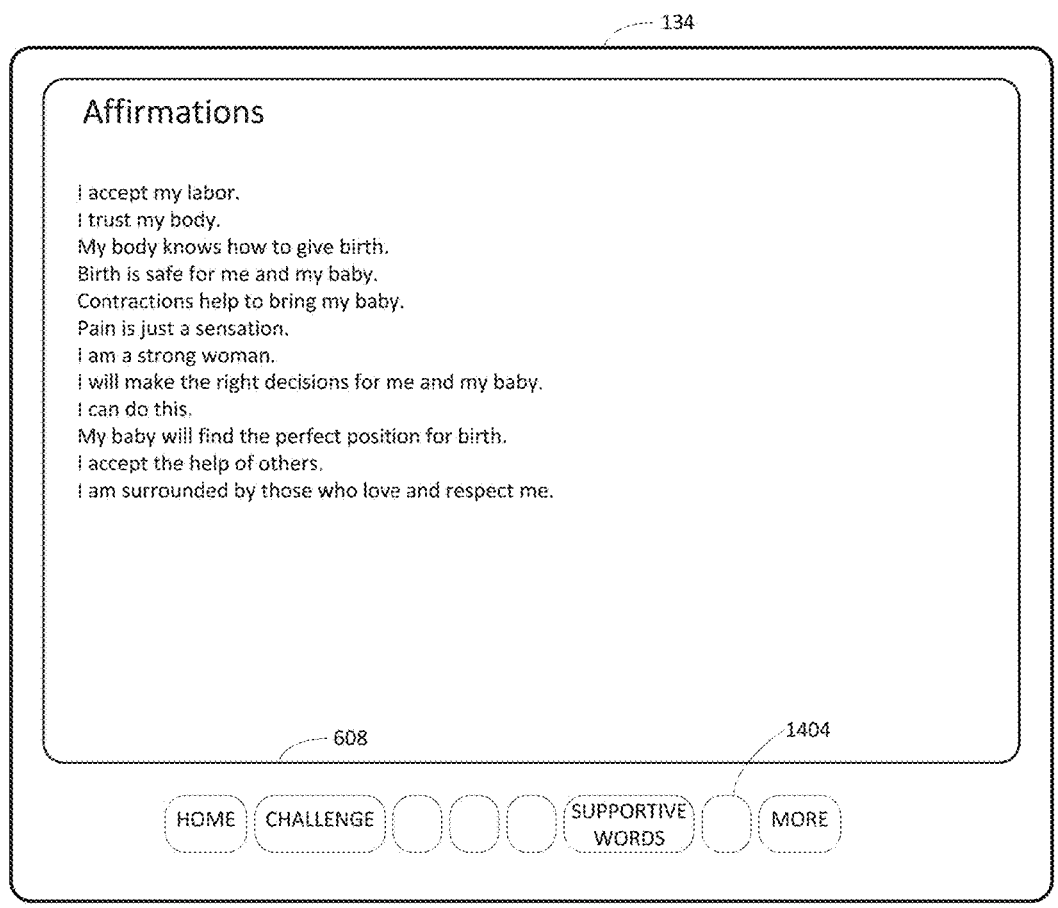
FIG. 44 is a screen capture of the Affirmations View of FIG. 6 according to an exemplary embodiment disclosed herein.

Referring now to FIG. 44, an Affirmations View 134 is displayed when the Affirmations tab event 1404 on the Tab Bar control 608 is detected by the Tab Bar Controller 109. The Affirmations View 134 can suggest short quotations for the laboring woman to say that, for example, help motivate and remind her that her body can give birth.

Figure 45:
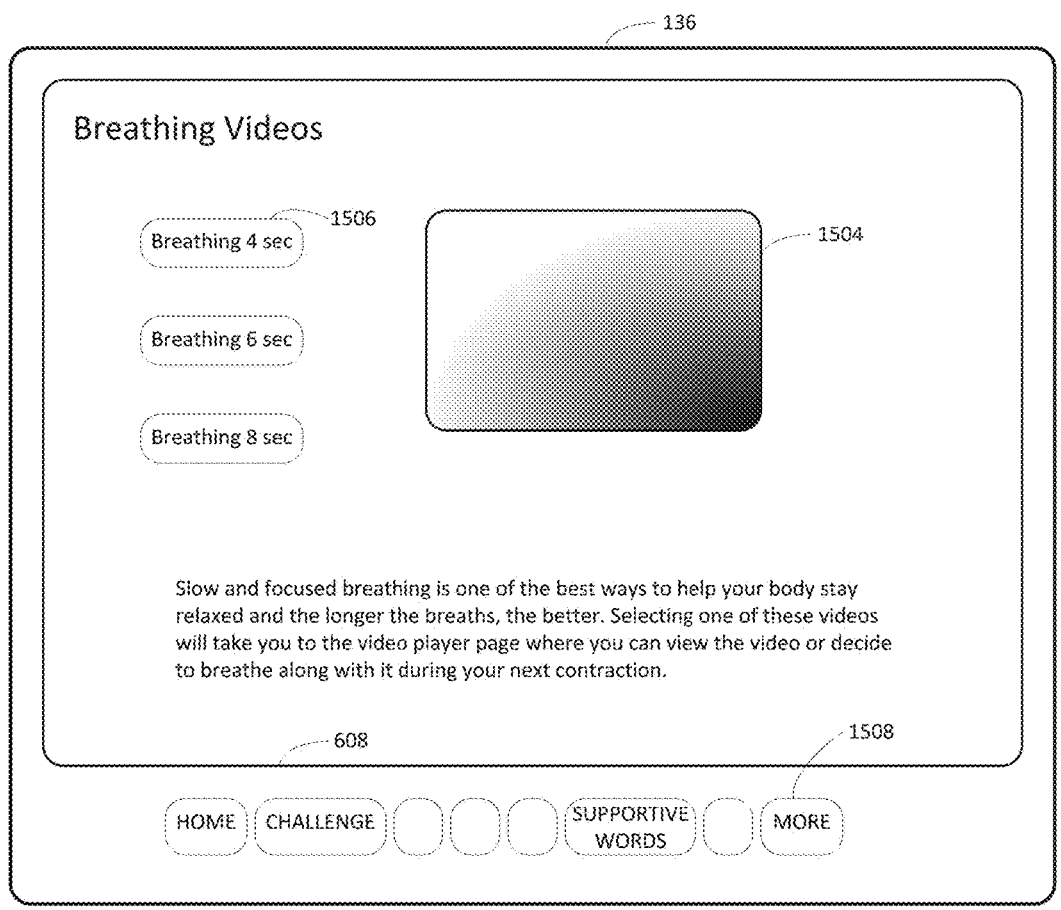
FIG. 45 is a screen capture of the Breathing View of FIG. 6 according to an exemplary embodiment disclosed herein.

In addition to static content, in certain instances, one or more instructional page views can display dynamic multimedia instructional content. With reference to FIG. 45, a Breathing View 136 is displayed when a child selection of the More tab 1508 on the Tab Bar control 608 associated with the Breathing View Controller 122 is triggered. The Breathing View 136 can include Buttons 1506 to load and playback videos of deep breathing of differing-length breaths such as, for example, four seconds, six seconds, and eight seconds. In some embodiments, one of the breathing video is used as the default video for the contraction timer until another video is queued resulting from the detection of a Use For Next Contraction button event 1010 in the Play Video View 130.

Figure 46:
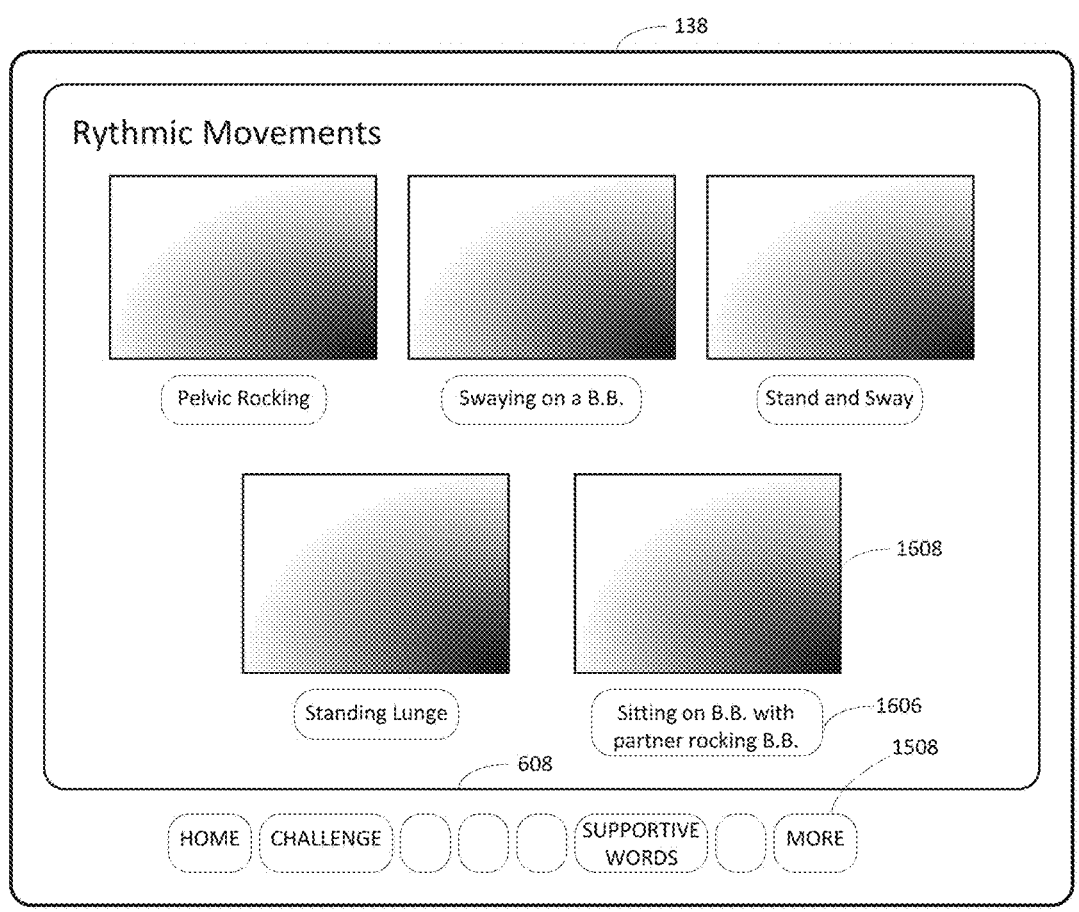
FIG. 46 is a screen capture of the Rhythmic Movement View of FIG. 6 according to an exemplary embodiment disclosed herein.

Referring now to FIG. 46, a Rhythmic Movement View 138 is displayed when a child selection of the More tab 1508 on the Tab Bar control 608 associated with the Rhythmic Movement View 138 is triggered. The Rhythmic Movement View 138 can include images acting as thumbnails previews of videos 1608. Buttons 1606 can load and playback videos of various rhythmic movements such as, for example, pelvic rocking, swaying on a birth ball, stand and sway, standing lunge, and/or sitting on birth ball with partner rocking birth ball.

Figure 47:
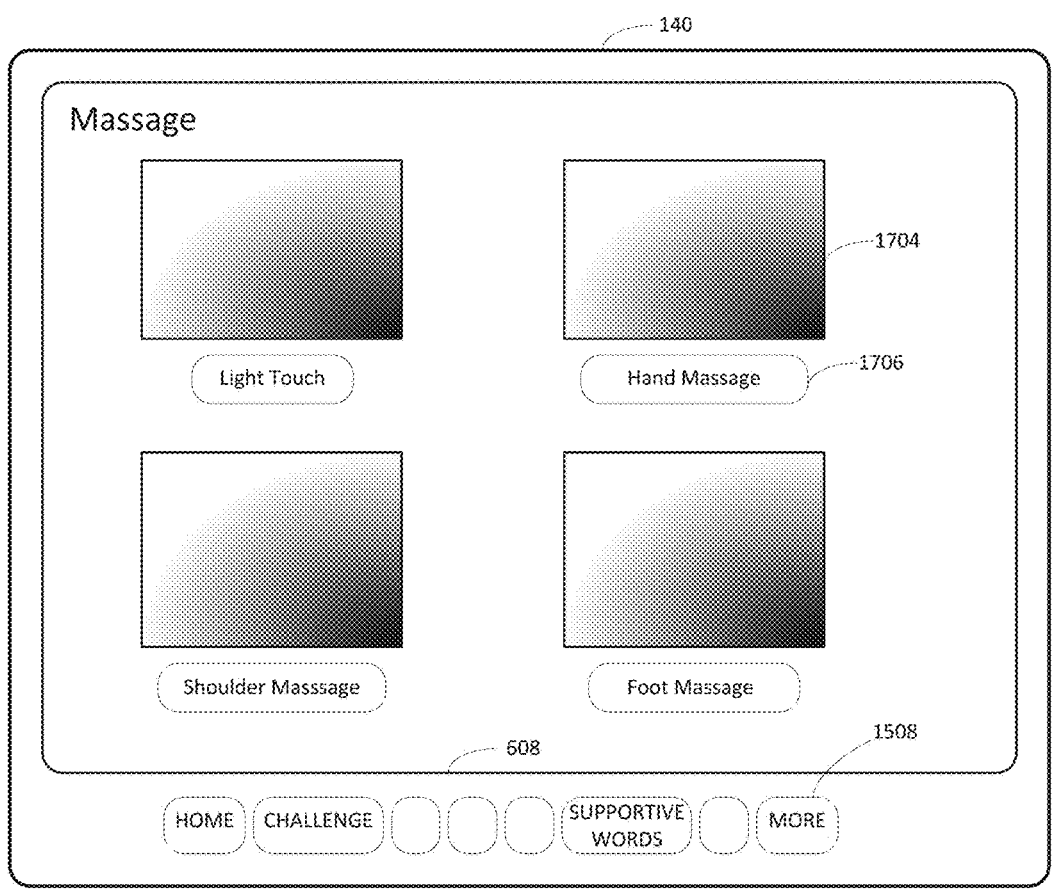
FIG. 47 is a screen capture of the Massage View of FIG. 6 according to an exemplary embodiment disclosed herein.

Referring now to FIG. 47, a Massage View 140 is displayed when a child selection of the More tab 1508 on the Tab Bar control 608 associated with the Massage View 140 is triggered. The Massage View 140 can include images acting as thumbnails previews of videos 1704. Buttons 1706 can load and playback videos of various massage treatments such as, for example, hand massage, foot massage, shoulder massage, and light touch.

In light of the exemplary embodiment and multiple additions and variations described above, the scope of the present invention shall be determined by the following claims:

We claim:

1. An interactive birthing patient computerized behavioral treatment delivery system comprising: receiving means for inputting data concerning one or more among a birthing patient preference, a birthing patient symptom, an external condition, or an available resource, evaluation means for automatically determining without interacting with a medical practitioner one or more available birthing patient behavioral treatment options according to a set of rules specifying birthing patient behavioral instructional content, the set of rules including: (i) rules specifying birthing patient behavioral instructional content according to desires and preferences of a birthing patient for behavioral treatment education, (ii) rules specifying birthing patient behavioral instructional content according to when a particular need, desire, condition, or symptom appears, (iii) rules specifying birthing patient behavioral instructional content according to one or more of physical attributes, state history, and decisions of the birthing patient and external and birthing patient variables, conditions, and circumstances, (iv) rules specifying birthing patient behavioral instructional content that shows the birthing patient what is occurring in her body and how far she has progressed and thereby tends to motivate her to continue with her labor by showing the extent of her progress, and (v) rules providing for selection of birthing patient behavioral instructional content by the birthing patient and thereby tending to provide her with confidence and a feeling of control, presenting means for displaying said one or more available birthing patient behavioral treatment options, monitoring means for detecting the occurrence of a birthing patient behavioral treatment option selection event, programming means for accessing birthing patient behavioral instructional content associated with said treatment option selection, and feedback means for displaying said birthing patient behavioral instructional content in an instructional view, wherein the birthing patient behavioral instructional content includes a plurality of videos, and wherein the input data comprises a biometric data collection device.

2. The system of claim 1 wherein the set of rules includes rules that specify notifying the patient or an assistant of the patient to perform certain actions at certain time intervals.

3. The system of claim 1 wherein the evaluation means automatically determines birthing patient behavioral treatment options according to historical information relating to preferences, decisions, and treatment results of the patient.

4. The system of claim 1 wherein the birthing patient symptom comprises one or more of station, dilation, effacement, and a parameter indicated by a fetal monitor; and the available resource comprises one or more of a birth ball, a massage tool, a shower, a bathtub, a heat pack, and a cold pack.

5. An interactive birthing patient computerized behavioral treatment delivery system comprising: (A) a computing device having an input, an output, a memory, and a processor; (B) birthing patient behavioral instructional content stored in the memory; (C) at least one of: (i) a plurality of symptoms associated with birthing, (ii) a plurality of preferences of a birthing patient, (iii) a plurality of birthing conditions, and (iv) a plurality of birthing treatment options stored in the memory; and (D) rules stored in the memory including: (i) rules specifying birthing patient behavioral instructional content according to desires and preferences of the birthing patient for behavioral treatment education, (ii) rules specifying birthing patient behavioral instructional content according to when a particular need, desire, condition, or symptom appears, (iii) rules specifying birthing patient behavioral instructional content according to one or more of physical attributes, state history, and decisions of the birthing patient and external and birthing patient variables, conditions, and circumstances, (iv) rules specifying birthing patient behavioral instructional content showing the patient what is occurring in her body and how far she has progressed and thereby tending to motivate her to continue with her labor by showing the extent of her progress, and (v) rules providing for selection of birthing patient behavioral instructional content by the birthing patient and thereby tending to provide her with confidence and a feeling of control, the processor configured to: (i) receive from the input one or more of birthing patient preferences, symptoms, external conditions, or available resources, (ii) automatically determine without interacting with a medical practitioner one or more available birthing patient behavioral instruction options according to the rules stored in the memory, (iii) display one or more of the available birthing patient behavioral instruction options through the output, (iv) detect the occurrence of a behavioral instruction option selection event through the input, (v) access birthing-patient behavioral instructional content associated with the behavioral instruction option selection, and (vi) display the behavioral instructional content through the output, wherein the birthing patient behavioral instructional content includes a plurality of videos, and wherein the input comprises a biometric data collection device.

6. The system of claim 5 wherein the input comprises at least a portion of a touch-sensitive video screen and the output comprises at least a portion of the touch-sensitive video screen.

7. The system of claim 5 wherein the computing device comprises a tablet.

8. The system of claim 5 wherein the rules include one or more rules that specify notifying the patient or an assistant of the patient to perform certain actions at certain time intervals.

9. The system of claim 5 wherein the processor is configured to automatically determine birthing patient behavioral instruction options according to historical information relating to preferences, decisions, and treatment results of the birthing patient.

10. The system of claim 5 wherein the input includes an interface control activation of which identifies a currently-displayed video for playback upon occurrence of a designated birthing patient event.

11. The system of claim 5 and further comprising a server computer communicable with the computing device.

12. The system of claim 11 wherein the server computer is programmed to distribute updates to the computing device.

13. The system of claim 5 wherein the processor is configured to require submission of valid authentication credentials.

14. The system of claim 5 wherein the symptoms comprise one or more of station, dilation, effacement, and a parameter indicated by a fetal monitor; and the available resources comprise one or more of a birth ball, a massage tool, a shower, a bathtub, a heat pack, and a cold pack.

15. A method of delivering behavioral treatment to a birthing patient, the method comprising: (A) receiving a first input including one or more of birthing patient preferences, symptoms, external conditions, or available resources; (B) determining in a computing device without interaction with a medical practitioner one or more treatment options according to a set of rules including: (i) rules specifying birthing patient behavioral instructional content according to desires and preferences of the birthing patient for behavioral treatment education, (ii) rules specifying birthing patient behavioral instructional content according to when a particular need, desire, condition, or symptom appears, (iii) rules specifying birthing patient behavioral instructional content according to one or more of physical attributes, state history, and decisions of the birthing patient and external and birthing patient variables, conditions, and circumstances, (iv) rules specifying birthing patient behavioral instructional content showing the patient what is occurring in her body and how far she has progressed and thereby tending to motivate her to continue with her labor by showing the extent of her progress, and (v) rules providing for selection of birthing patient behavioral instructional content by the birthing patient and thereby tending to provide her with confidence and a feeling of control; (C) displaying the determined available treatment options in a selection view; (D) detecting a treatment option selection event in the selection view; (E) accessing birthing patient behavioral instructional content associated with the treatment option selection event, and (F) displaying the accessed birthing patient behavioral instructional content in an instructional view, wherein the birthing patient behavioral instructional content includes a plurality of videos, and wherein the input comprises a biometric data collection device.

16. The method of claim 15 and further comprising storing a session log containing information on data obtained during a session in which birthing patient behavioral instructional content is displayed.

17. The method of claim 16 wherein the session log includes at least one among a plurality of configuration parameter values, a navigation path history, a plurality of patient selection values, a plurality of patient condition values, and a plurality of session activity time stamps.

18. The method of claim 15 wherein the birthing patient behavioral instructional content includes graphic anatomical display instruction.

19. The method of claim 15 and further comprising displaying a reminder at a configurable time interval during a session in which birthing patient behavioral instructional content is displayed.

20. The method of claim 15 wherein the birthing patient behavioral instructional content comprises partner participation indicia.

21. The method of claim 15 and further comprising:
(G) receiving a second input;
(H) responsive to the second input, determining in a computing device without interaction with a medical practitioner one or more treatment options according to the set of rules;
(I) displaying the determined available treatment options in a selection view;
(J) detecting a treatment option selection event in the selection view;

(K) accessing birthing patient behavioral instructional content associated with the treatment option selection event; and (L) displaying the accessed birthing patient behavioral instructional content in the instructional view.

22. The method of claim 15 wherein the symptoms comprise one or more of station, dilation, effacement, and a parameter indicated by a fetal monitor; and the available resources comprise one or more of a birth ball, a massage tool, a shower, a bathtub, a heat pack, and a cold pack.

* * * * *